US012745101B2

(12) United States Patent
Kita

(10) Patent No.: US 12,745,101 B2
(45) Date of Patent: Sep. 22, 2026

(54) DETERMINATION OF A MACHINE LEARNING MODEL TO BE USED FOR A GIVEN PURPOSE RELATED TO A COMMUNICATION SYSTEM

(71) Applicant: RAKUTEN MOBILE, INC., Tokyo (JP)

(72) Inventor: Shinya Kita, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 331 days.

(21) Appl. No.: 18/570,635

(22) PCT Filed: Aug. 30, 2022

(86) PCT No.: PCT/JP2022/032682
§ 371 (c)(1),
(2) Date: Dec. 15, 2023

(87) PCT Pub. No.: WO2024/047775
PCT Pub. Date: Mar. 7, 2024

(65) Prior Publication Data

US 2025/0097721 A1 Mar. 20, 2025

(51) Int. Cl.
*H04W 16/22* (2009.01)
*H04W 24/08* (2009.01)

(52) U.S. Cl.
CPC ........... *H04W 16/22* (2013.01); *H04W 24/08* (2013.01)

(58) Field of Classification Search
CPC .............................. H04W 24/08; H04W 16/22
(Continued)

(56) References Cited

U.S. PATENT DOCUMENTS 11,227,047 B1 1/2022 Vashisht et al.
11,392,803 B2 * 7/2022 Kamdar .............. G06F 18/2185
(Continued)

FOREIGN PATENT DOCUMENTS

CN 112825576 A * 5/2021 ....... G06F 18/23213
JP 2019092125 A 6/2019
(Continued)

OTHER PUBLICATIONS

Extended European Search Report in EP Application No. 22957373.8 dated Sep. 19, 2025, 8pp.
(Continued)

*Primary Examiner* — Peter G Solinsky
(74) *Attorney, Agent, or Firm* — HAUPTMAN HAM, LLP

(57) ABSTRACT

It is enabled that accurate determination of a machine learning model suitable for a communication system from among a plurality of machine learning models to be used for a given prediction purpose related to the communication system. An AI (70) inputs, to each of a plurality of trained machine learning models, input data corresponding to the machine learning model, and acquires a predicted value as an output of the machine learning model. The AI (70) evaluates an accuracy of a prediction related to the prediction purpose by the machine learning model based on the acquired predicted value and, of test data, a part indicating an actual result value corresponding to the predicted value. The AI (70) determines at least one machine learning model among the plurality of trained machine learning models based on a result of the evaluation of the accuracy.

10 Claims, 17 Drawing Sheets

(58) Field of Classification Search
USPC .......................................................... 370/252
See application file for complete search history.

(56) References Cited

U.S. PATENT DOCUMENTS

| | | | | |
|---|---|---|---|---|
| 11,537,990 | B2 * | 12/2022 | Reynolds | G06F 16/2462 |
| 11,645,541 | B2 * | 5/2023 | Gupta | G06N 3/08<br>706/20 |
| 12,117,997 | B2 * | 10/2024 | Reynolds | G06F 16/248 |
| 12,149,417 | B2 * | 11/2024 | Khan | H04L 41/149 |
| 12,379,983 | B2 * | 8/2025 | Schlichting | G06N 20/00 |
| 2020/0401946 | A1 | 12/2020 | Bonawitz et al. | |
| 2022/0004897 | A1 | 1/2022 | Jadon et al. | |
| 2023/0063587 | A1 * | 3/2023 | Pagtakhan | G06F 16/7867 |
| 2023/0139356 | A1 * | 5/2023 | Sallas | H04N 21/42222<br>348/734 |
| 2023/0222043 | A1 | 7/2023 | Lee et al. | |
| 2023/0239854 | A1 * | 7/2023 | Newman | H04B 7/043 |
| 2023/0267786 | A1 * | 8/2023 | Kashi | G07C 9/00912<br>70/63 |
| 2023/0419130 | A1 | 12/2023 | Saxena et al. | |

FOREIGN PATENT DOCUMENTS

| | | | | |
|---|---|---|---|---|
| WO | 2021171341 | A1 | 9/2021 | |
| WO | WO-2023129944 | A1 * | 7/2023 | G06N 3/08 |

OTHER PUBLICATIONS

Extended European Search Report in EP Application No. 22957373.8 dated Sep. 29, 2025, 8pp.

Extended European Search Report in EP Application No. 22957374.6 dated Sep. 30, 2025, 12pp.

* cited by examiner 30
62
ORCHESTRATOR (E2EO)
94
LIFE CYCLE MANAGER
92
SLICE MANAGER
90
POLICY MANAGER
64
SERVICE CATALOG STORAGE
80
REPOSITORY
78
CONTAINER MANAGER
76
CONFIGURATION MANAGER
74
SDN CONTROLLER
72
MONITOR
70
AI
68
DATA BUS
66
BIG-DATA PLATFORM
60
OPERATION SUPPORT SYSTEM(OSS)
84
TICKET MANAGER
86
FAILURE MANAGER
88
PERFORMANCE MANAGER
82
INVENTORY DATABASE

FIG.6

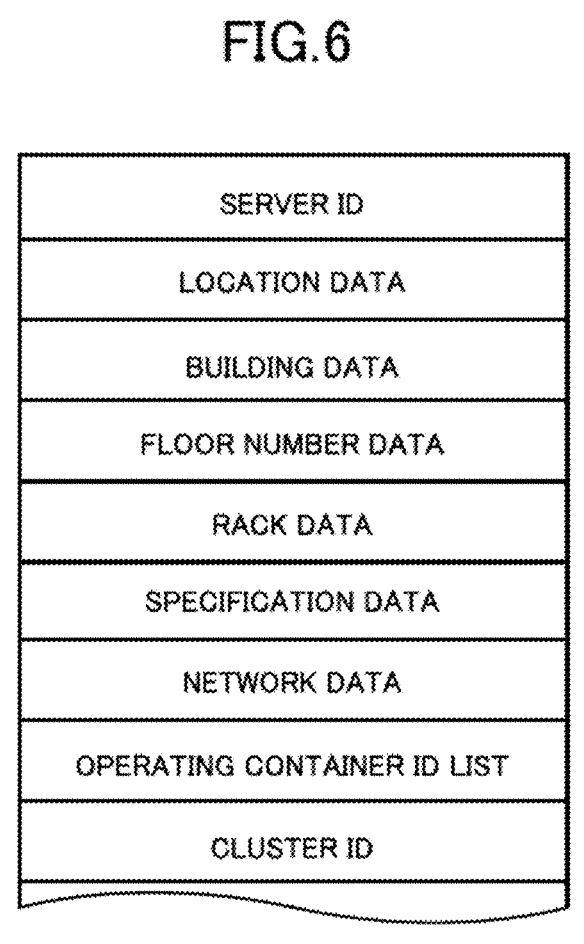

| SERVER ID |
| --- |
| LOCATION DATA |
| BUILDING DATA |
| FLOOR NUMBER DATA |
| RACK DATA |
| SPECIFICATION DATA |
| NETWORK DATA |
| OPERATING CONTAINER ID LIST |
| CLUSTER ID |

DO YOU WANT TO INSTALL THROUGHPUT PREDICTION AI?

INPUT PERFORMANCE INDEX VALUE:UPF THROUGHPUT,
NUMBER OF REGISTRATIONS, NUMBER OF COMPLETED CONNECTIONS ...

DETERMINATION OF A MACHINE LEARNING MODEL TO BE USED FOR A GIVEN PURPOSE RELATED TO A COMMUNICATION SYSTEM

RELATED APPLICATIONS

The present application is a National Phase of International Application Number PCT/JP2022/032682, filed Aug. 30, 2022.

TECHNICAL FIELD

The present invention relates to determination of a machine learning model to be used for a given prediction purpose related to a communication system.

BACKGROUND ART

There has been a technology for predicting a performance index value of a communication system. As an example of such a technology, in Patent Literature 1, there is described estimating throughput based on, for example, the number of terminals existing in a mesh "i" or the number of terminals that exist in the mesh "i" and that are performing communication.

Further, in recent years, predictions utilizing machine learning have become widely used.

CITATION LIST

Patent Literature

[Patent Literature 1] JP 2019-92125 A

SUMMARY OF INVENTION

Technical Problem

For example, it is conceivable to use a trained machine learning model to predict the performance index value of the communication system based on an actual result value of the performance index value of the communication system.

For the same prediction purpose related to a communication system, a plurality of machine learning models having different types of data to be input may be prepared, but in the related art, it is not possible to accurately determine a machine learning model suitable for the communication system of interest from among those plurality of machine learning models.

The present invention has been made in view of the above-mentioned circumstances, and has an object to enable accurate determination of a machine learning model suitable for communication system from among a plurality of machine learning models to be used for a given prediction purpose related to the communication system.

Solution to Problem

In order to solve the above-mentioned problem, according to one embodiment of the present disclosure, there is provided a model determination system including: test data acquisition means for acquiring test data indicating a time series of actual result values of a plurality of types of performance index values related to a communication system; predicted value acquisition means for inputting, to each of a plurality of trained machine learning models to be used for a given prediction purpose related to the communication system, input data corresponding to the machine learning model and acquiring a predicted value for a prediction time point, the input data being a part of the test data, the input data indicating the actual result value for at least one of time points with respect to at least one of the plurality of types of performance index values, pieces of the input data to be input to the plurality of trained machine learning models being different from each other, and the prediction time point being later than any one of the time points; prediction accuracy evaluation means for evaluating, for each of the plurality of trained machine learning models, an accuracy of a prediction related to the given prediction purpose by the machine learning model based on the acquired predicted value and, of the test data, a part indicating the actual result value at the prediction time point of the at least one of the plurality of types corresponding to the predicted value; and model determination means for determining at least one machine learning model among the plurality of trained machine learning models based on a result of the evaluation of the accuracy.

Further, according to one embodiment of the present disclosure, there is provided a model determination method including: acquiring test data indicating a time series of actual result values of a plurality of types of performance index values related to a communication system; inputting, to each of a plurality of trained machine learning models to be used for a given prediction purpose related to the communication system, input data corresponding to the machine learning model and acquiring a predicted value for a prediction time point, the input data being a part of the test data, the input data indicating the actual result value for at least one of time points with respect to at least one of the plurality of types of performance index values, pieces of the input data to be input to the plurality of trained machine learning models being different from each other, and the prediction time point being later than any one of the time points; evaluating, for each of the plurality of trained machine learning models, an accuracy of a prediction related to the given prediction purpose by the machine learning model based on the acquired predicted value and, of the test data, a part indicating the actual result value at the prediction time point of the at least of the plurality of types corresponding to the predicted value; and determining at least one machine learning model among the plurality of trained machine learning models based on a result of the evaluation of the accuracy.

BRIEF DESCRIPTION OF DRAWINGS

FIG. 6 is a diagram for illustrating an example of data structure of physical inventory data.

DESCRIPTION OF EMBODIMENTS

One embodiment of the present invention is now described in detail with reference to the drawings.

Figure 1:
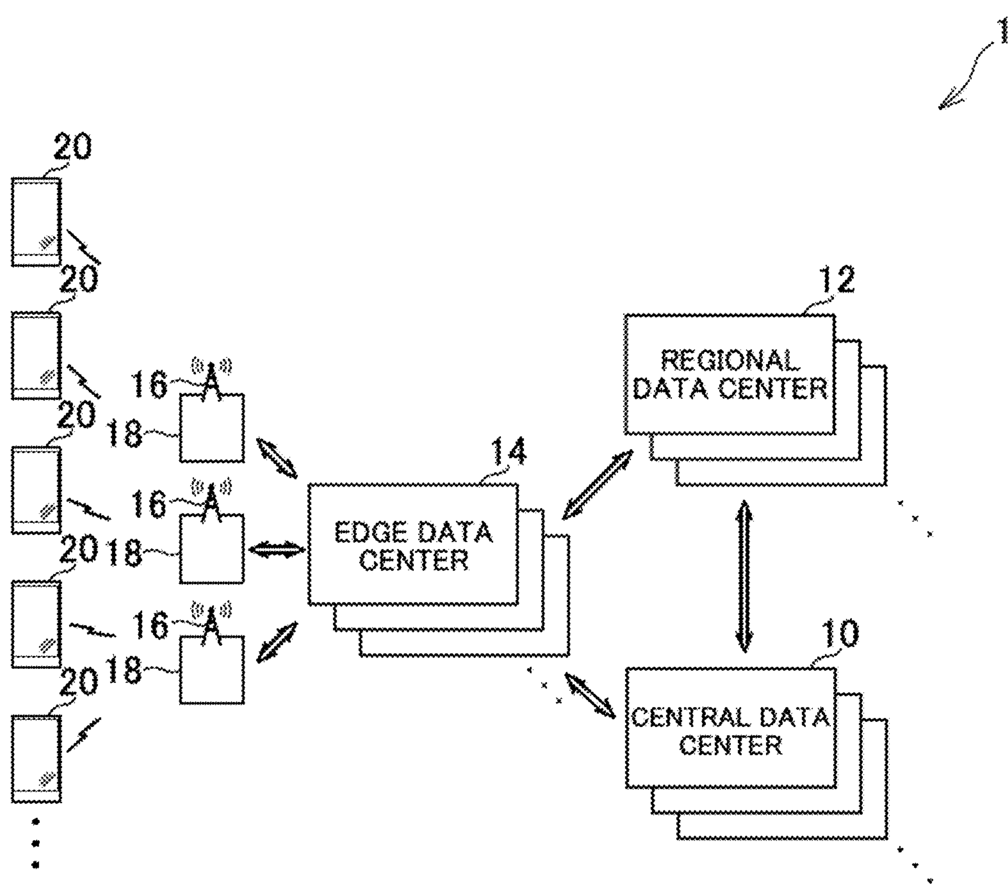
FIG. 1 is a diagram for illustrating an example of a communication system in one embodiment of the present invention.
Figure 2:
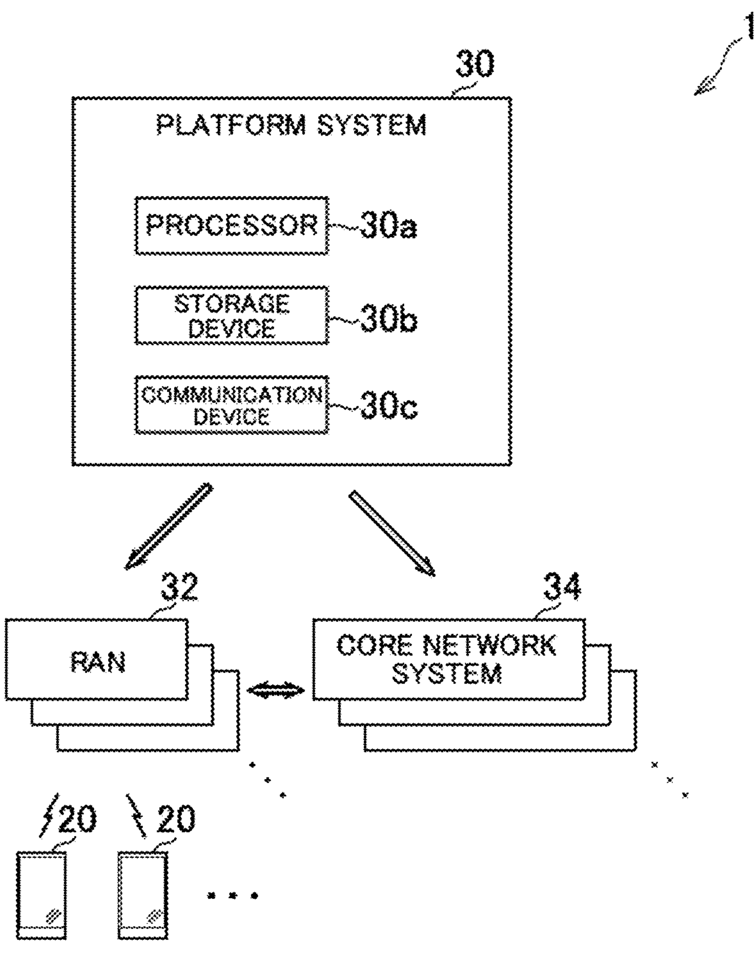
FIG. 2 is a diagram for illustrating an example of the communication system in the one embodiment of the present invention.

FIG. 1 and FIG. 2 are each a diagram for illustrating an example of a communication system 1 in the one embodiment of the present invention. FIG. 1 is an illustration drawn with attention being given to locations of a data center group included in the communication system 1. FIG. 2 is an illustration drawn with attention being given to various computer systems implemented in the data center group included in the communication system 1.

As illustrated in FIG. 1, the data center group included in the communication system 1 is classified into central data centers 10, regional data centers 12, and edge data centers 14.

For example, several central data centers 10 are dispersedly arranged in an area (for example, in Japan) covered by the communication system 1.

For example, tens of regional data centers 12 are dispersedly arranged in the area covered by the communication system 1. For example, when the area covered by the communication system 1 is the entire area of Japan, one or two regional data centers 12 may be arranged in each prefecture.

For example, thousands of edge data centers 14 are dispersedly arranged in the area covered by the communication system 1. In addition, each of the edge data centers 14 can communicate to and from a communication facility 18 provided with an antenna 16. In this case, as illustrated in FIG. 1, one edge data center 14 may be capable of communicating to and from several communication facilities 18. The communication facility 18 may include a computer such as a server computer. The communication facility 18 in this embodiment performs radio communication to and from a user equipment (UE) 20 via the antenna 16. The communication facility 18 provided with the antenna 16 is provided with, for example, a radio unit (RU), which is described later.

A plurality of servers are arranged in each of the central data centers 10, the regional data centers 12, and the edge data centers 14 in this embodiment.

In this embodiment, for example, the central data centers 10, the regional data centers 12, and the edge data centers 14 can communicate to and from one another. Communication can also be performed between the central data centers 10, between the regional data centers 12, and between the edge data centers 14.

As illustrated in FIG. 2, the communication system 1 in this embodiment includes a platform system 30, a plurality of radio access networks (RANs) 32, a plurality of core network systems 34, and a plurality of UEs 20. The core network system 34, the RAN 32, and the UE 20 cooperate with each other to implement a mobile communication network.

The RAN 32 is a computer system, which is provided with the antenna 16, and corresponds to an eNodeB (eNB) in a fourth generation mobile communication system (hereinafter referred to as "AG") and an NR base station (qNB) in a fifth generation mobile communication system (hereinafter referred to as "5G"). The RANs 32 in this embodiment are implemented mainly by server groups arranged in the edge data centers 14 and the communication facilities 18. A part of the RAN 32 (for example, distributed unit (DU) or central unit (CU) or virtual distributed unit (vDU) or virtual central unit (vCU)) may be implemented by the central data center 10 or the regional data center 12 instead of the edge data center 14.

The core network system 34 is a system corresponding to an evolved packet core (EPC) in 4G or a 5G core (5GC) in 5G. The core network systems 34 in this embodiment are implemented mainly by server groups arranged in the central data centers 10 or the regional data centers 12.

The platform system 30 in this embodiment is configured, for example, on a cloud platform and includes a processor 30*a*, a storage device 30*b*, and a communication device 30*c*, as illustrated in FIG. 2. The processor 30*a* is a program control device such as a microprocessor which operates in accordance with a program installed in the platform system 30. The storage device 30*b* is, for example, a storage element such as a ROM or RAM, a solid state drive (SSD), a hard disk drive (HDD), or the like. The storage device 30*b* stores a program to be executed by the processor 30*a*, and the like. The communication device 30*c* is, for example, a communication interface such as a network interface controller (NIC) or a wireless local area network (LAN) module. Software-defined networking (SDN) may be implemented in the communication device 30*c*. The communication device 30*c* exchanges data with the RAN 32 and the core network system 34.

In this embodiment, the platform system 30 is implemented by a server group arranged in the central data center 10. The platform system 30 may be implemented by a server group arranged in the regional data center 12.

In this embodiment, for example, in response to a purchase request for a network service (NS) by a purchaser, the network service for which the purchase request has been made is constructed in the RAN 32 or the core network system 34. Then, the constructed network service is provided to the purchaser.

For example, network such as a voice a service, communication service, a data communication service, or the like, is provided to the purchaser who is a mobile virtual network operator (MVNO). The voice communication service or the data communication service provided in this embodiment is eventually provided to a customer (end user) for the purchaser (MVNO in the above-mentioned example), who uses the UE 20 illustrated in FIG. 1 and FIG. 2. The end user can perform voice communication or data communication to and from other users via the RAN 32 or the core network system 34. The UE 20 of the end user can also access a data network such as the Internet via the RAN 32 or the core network system 34.

In addition, in this embodiment, an Internet of things (IoT) service may be provided to an end user who uses a robot arm, a connected car, or the like. In this case, an end user who uses, for example, a robot arm, a connected car, or the like may be a purchaser of the network service in this embodiment.

In this embodiment, a container-type virtualized application execution environment such as Docker (trademark) is installed in the servers arranged in the central data center 10, the regional data center 12, and the edge data center 14, and containers can be deployed in those servers and operated. In those servers, a cluster formed of one or more containers generated by be such a virtualization technology may be constructed. For example, a Kubernetes cluster managed by a container management tool such as Kubernetes (trademark) may be constructed. Then, a processor on the constructed cluster may execute a container-type application.

The network service provided to the purchaser in this embodiment is formed of one or a plurality of functional units (for example, network function (NF)). In this embodiment, the functional unit is implemented by the NF implemented by the virtualization technology. The NF implemented by the virtualization technology is called "virtualized network function (VNF)." It does not matter what kind of virtualization technology has been used for virtualization. For example, a containerized network function (CNF) implemented by a container-type virtualization technology is also included in the VNF in this description. This embodiment is described on the assumption that the network service is implemented by one or a plurality of CNEs. The functional unit in this embodiment may also correspond to a network node.

Figure 3:
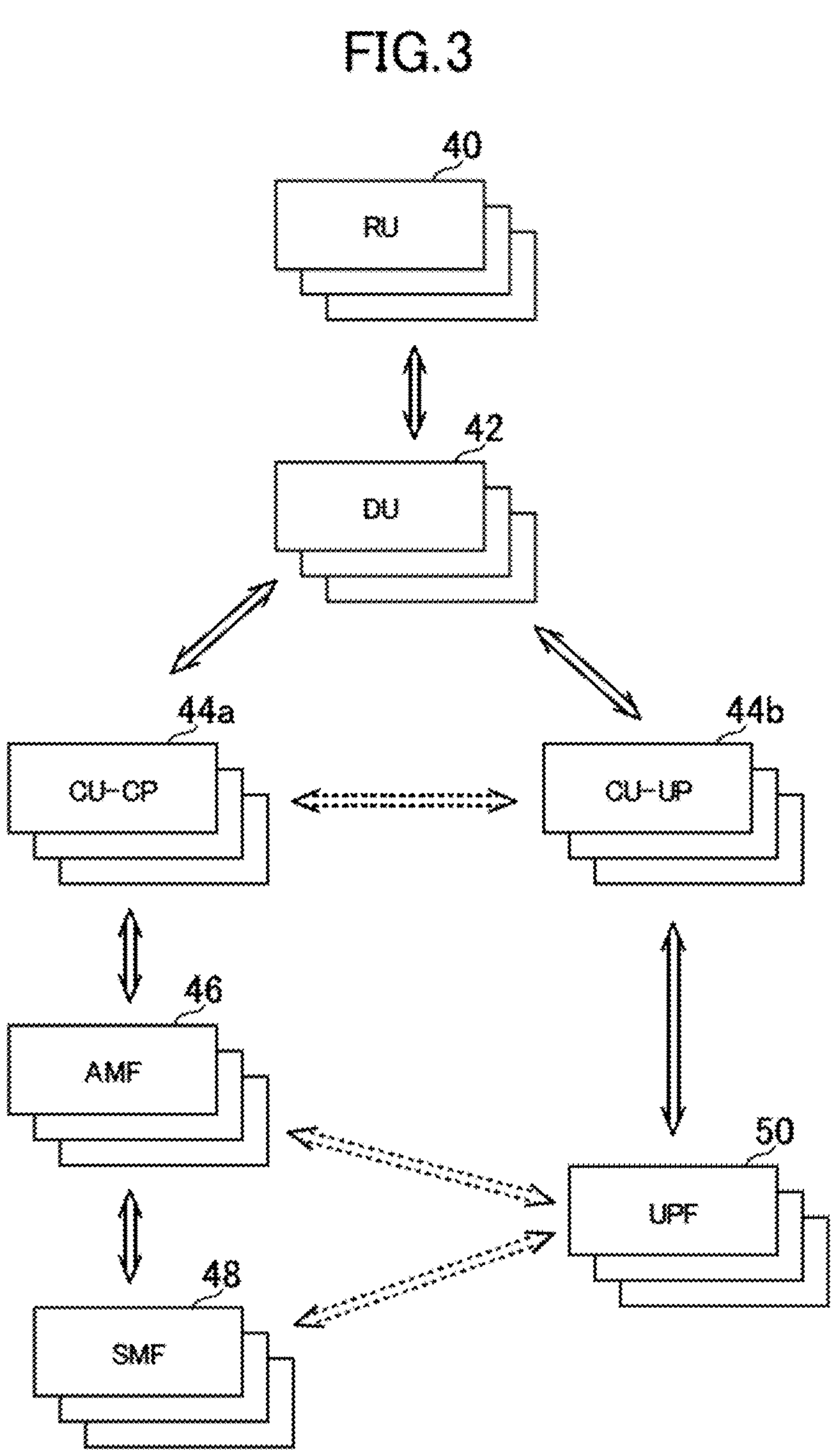
FIG. 3 is a diagram for schematically illustrating an example of a network service in the one embodiment of the present invention.

FIG. 3 is a diagram for schematically illustrating an example of an operating network service. The network service illustrated in FIG. 3 includes NES, such as a plurality of RUs 40, a plurality of DUs 42, a plurality of CUs 44 (central unit-control planes (CU-CPs) 44*a* and central unit-user planes (CU-UPs) 44*b*), a plurality of access and mobility management functions (AMFs) 46, a plurality of session management functions (SMFs) 48, and a plurality of user plane functions (UPFs) 50, as software elements.

In the example of FIG. 3, the RUs 40, the DUs 42, the CU-CPs 44*a*, the AMFs 46, and the SMFs 48 correspond to elements of the control plane (C-plane), and the RUs 40, the DUs 42, the CU-UPs 44*b*, and the UPFs 50 correspond to elements of the user plane (U-plane).

The network service may include other types of NFS as software elements. In addition, the network service is implemented on a plurality of servers or other computer resources (hardware elements).

In this embodiment, for example, the network service illustrated in FIG. 3 provides a communication service in a certain area.

In this embodiment, it is also assumed that the plurality of RUs 40, the plurality of DUs 42, the plurality of CU-UPS 44*b*, and the plurality of UPFs 50, which are illustrated in FIG. 3, belong to one end-to-end network slice.

Figure 4:
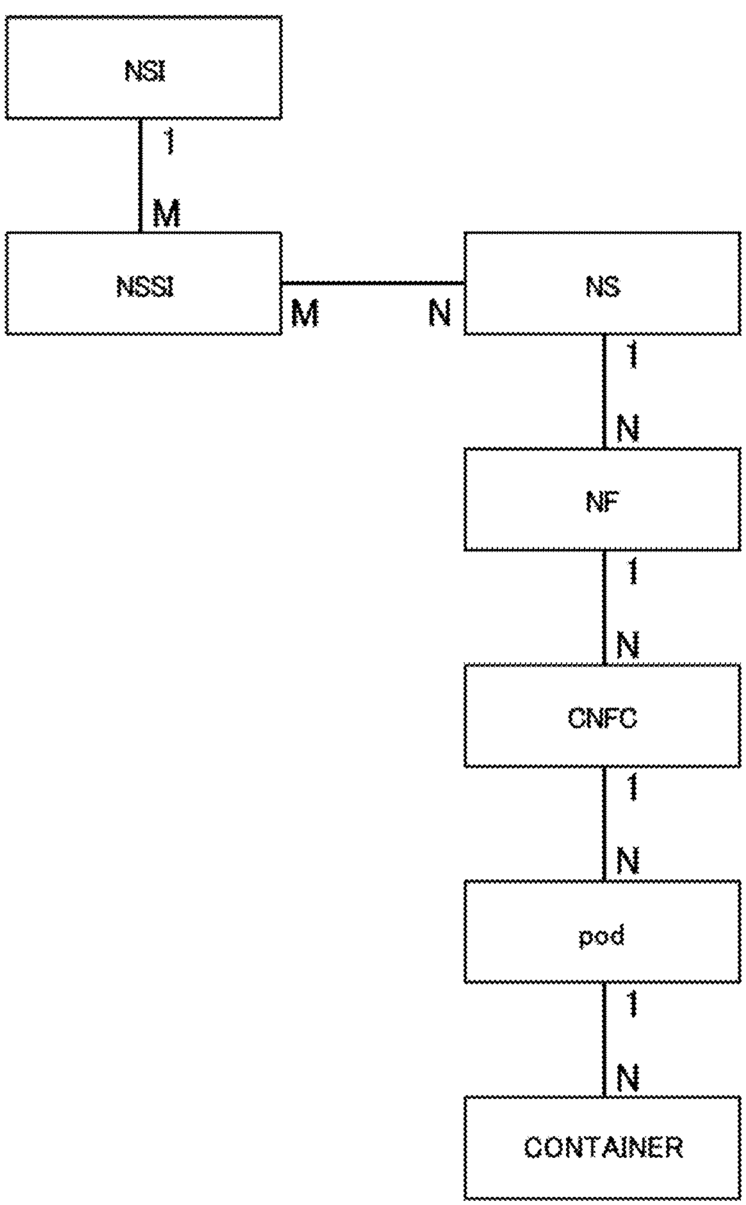
FIG. 4 is a diagram for illustrating an example of links between elements constructed in the communication system in the one embodiment of the present invention.

FIG. 4 is a diagram for schematically illustrating an example of links between elements constructed in the communication system 1 in this embodiment. Symbols M and N indicated in FIG. 4 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship.

As illustrated in FIG. 4, a network service (NS), a network function (NF), a containerized network function component (CNFC), a pod, and a container have a hierarchical structure.

The NS corresponds to, for example, a network service formed of a plurality of NEs. In this case, the NS may correspond to an element having a granularity, such as a 5GC, an EPC, a 5G RAN (gNB), or a 4G RAN (eNB).

In 5G, the NF corresponds to an element having a granularity, such as the RU, the DU, the CU-UP, the AMF, the SMF, or the UPF. In 4G, the NF corresponds to an element having a granularity, such as a mobility management entity (MME), a home subscriber server (HSS), a serving gateway (S-GW), a vDU, or a vCU. In this embodiment, for example, one NS includes one or a plurality of NEs. That is, one or a plurality of NFs are under the control of one NS.

The CNFC corresponds to an element having a granularity, such as DU mgmt or DU processing. The CNFC may be a microservice deployed on a server as one or more containers. For example, some CNFCs may be microservices that provide a part of the functions of the DU, the CU-CP, the CU-UP, and the like. Some CNFCs may be microservices that provide a part of the functions of the UPF, the AMF, the SMF, and the like. In this embodiment, for example, one NF includes one or a plurality of CNFCs. That is, one or a plurality of CNFCs are under the control of one NF.

The pod refers to, for example, the minimum unit for managing a Docker container by Kubernetes. In this embodiment, for example, one CNFC includes one or a plurality of pods. That is, one or a plurality of pods are under the control of one CNFC.

In this embodiment, for example, one pod includes one or a plurality of containers. That is, one or a plurality of containers are under the control of one pod.

In addition, as illustrated in FIG. 4, a network slice (NSI) and a network slice subnet instance (NSSI) have hierarchical structure.

The NSIs can be said to be end-to-end virtual circuits that span a plurality of domains (for example, from the RAN 32 to the core network system 34). Each NSI may be a slice for high-speed and high-capacity communication (for example, for enhanced mobile broadband (eMBB)), a slice for high-reliability and low-latency communication (for example, for ultra-reliable and low latency communications (URLLC)), or a slice for connecting a large quantity of terminals (for example, for massive machine type communication (mMIC)). The NSSIs can be said to be single domain virtual circuits dividing an NSI. Each NSSI may be a slice of a RAN domain, a slice of a transport domain such as a mobile back haul (MBH) domain, or a slice of a core network domain.

In this embodiment, for example, one NSI includes one or a plurality of NSSIs. That is, one or a plurality of NSSIs are under the control of one NSI. In this embodiment, a plurality of NSIs may share the same NSSI.

In addition, as illustrated in FIG. 4, the NSSI and the NS generally have a many-to-many relationship.

In addition, in this embodiment, for example, one NF can belong to one or a plurality of network slices. Specifically, for example, network slice selection assistance information (NSSAI) including one or a plurality of pieces of sub-network slice selection assist information (S-NSSAI) can be set for one NF. In this case, the S-NSSAI is information associated with the network slice. The NF is not required to belong to the network slice.

Figure 5:
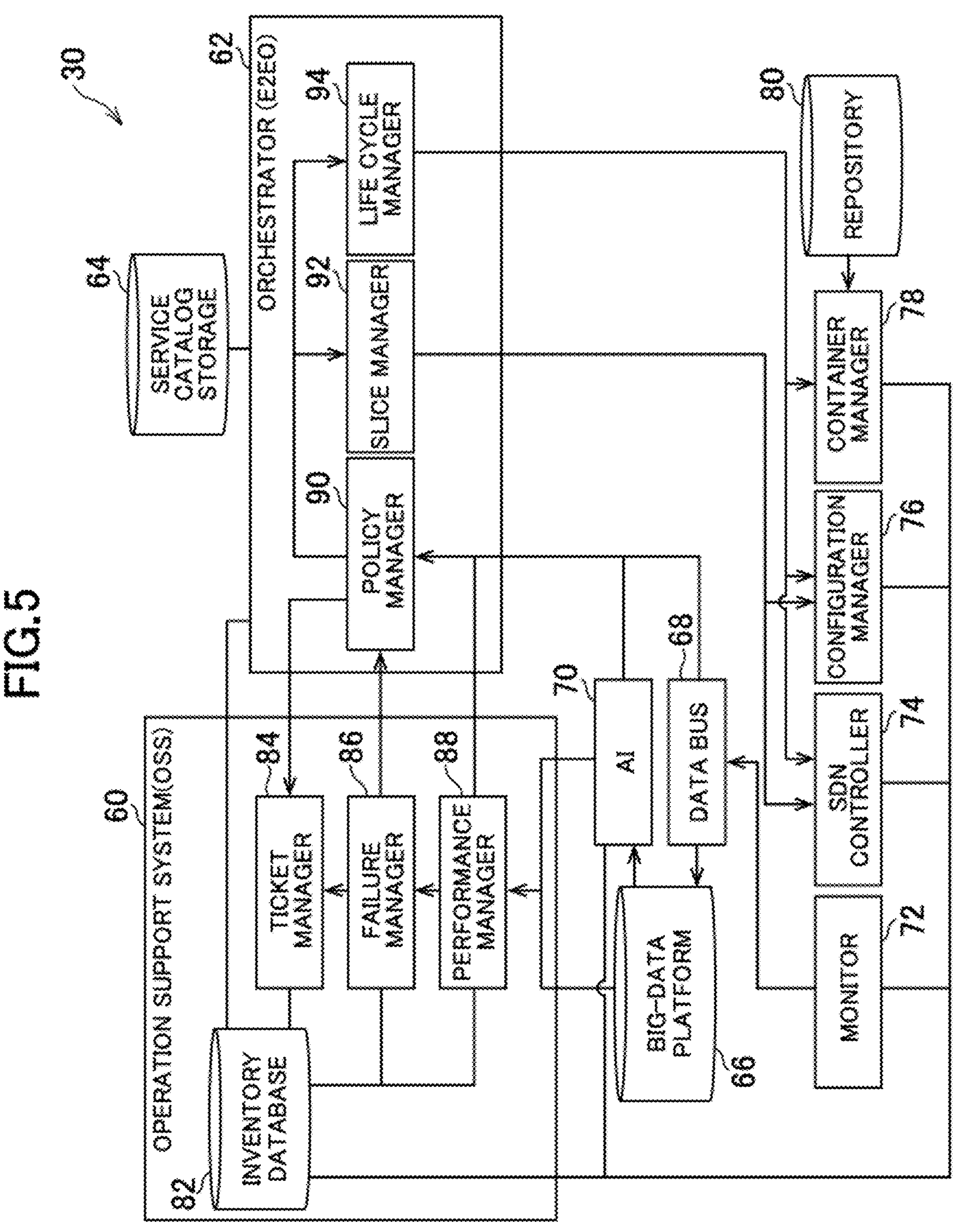
FIG. 5 is a functional block diagram for illustrating an example of functions implemented by a platform system in the one embodiment of the present invention.

FIG. 5 is a functional block diagram for illustrating an example of functions implemented by the platform system 30 in this embodiment. The platform system 30 in this embodiment is not required to implement all the functions illustrated in FIG. 5, and may implement functions other than those illustrated in FIG. 5.

As illustrated in FIG. 5, the platform system 30 in this embodiment functionally includes, for example, an operation support system (OSS) 60, an orchestrator (end-to-end-orchestrator (E2EO)) 62, a service catalog storage 64, a big-data platform 66, a data bus 68, an artificial intelligence (AI) 70, a monitor 72, an SDN controller 74, a configuration manager 76, a container manager 78, and a repository 80. The OSS 60 includes an inventory database 82, a ticket manager 84, a failure manager 86, and a performance manager 88. The E2EO 62 includes a policy manager 90, a slice manager 92, and a life cycle manager 94. Those elements are implemented mainly by the processor 30*a*, the storage device 30*b* and the communication device 30*c*.

The functions illustrated in FIG. 5 may be implemented by executing, by the processor 30*a*, a program that is installed in the platform system 30, which is one or a plurality of computers, and that includes instructions corresponding to the functions. This program may be supplied to the platform system 30 via a computer-readable information storage medium, such as an optical disc, a magnetic disk, a magnetic tape, a magneto-optical disc, a flash memory, or the like, or via the Internet or the like. The functions illustrated in FIG. 5 may also be implemented by a circuit block, a memory, and other LSIs. Further, a person skilled in the art would understand that the functions illustrated in FIG. 5 can be implemented in various forms by only hardware, by only software, or by a combination of hardware and software.

The container manager 78 executes life cycle management of a container. For example, the life cycle management includes processes relating to the construction of the container such as the deployment and setting of the container.

In this case, the platform system 30 in this embodiment may include a plurality of container managers 78. In each of the plurality of container managers 78, a container management tool such as Kubernetes, and a package manager such as Helm may be installed. Each of the plurality of container managers 78 may execute the construction of a container such as the deployment of the container for a server group (for example, Kubernetes cluster) associated with the container manager 78.

The container manager 78 is not required to be included in the platform system 30. The container manager 78 may be provided in, for example, a server (that is, the RAN 32 or the core network system 34) managed by the container manager 78, or another server that is annexed to the server managed by the container manager 78.

In this embodiment, the repository 80 stores, for example, a container image of a container included in a functional unit group (for example, NF group) that implements a network service.

The inventory database 82 is a database in which inventory information is stored. The inventory information includes, for example, information on a server arranged in the RAN 32 or the core network system 34 and managed by the platform system 30.

Further, in this embodiment, the inventory database 82 stores inventory data. The inventory data indicates the current statuses of the configuration of an element group included in the communication system 1 and the link between the elements. In addition, the inventory data indicates the status of resources managed by the platform system 30 (for example, resource usage status). The inventory data may be physical inventory data or may be logical inventory data. The physical inventory data and the logical inventory data are described later.

FIG. 6 is a diagram for illustrating an example of the data structure of the physical inventory data. The physical inventory data illustrated in FIG. 6 is associated with one server. The physical inventory data illustrated in FIG. 6 includes, for example, a server ID, location data, building data, floor number data, rack data, specification data, network data, an operating container ID list, and a cluster ID.

The server ID included in the physical inventory data is, for example, an identifier of the server associated with the physical inventory data.

The location data included in the physical inventory data is, for example, data indicating the location of the server (for example, the address of the location) associated with the physical inventory data.

The building data included in the physical inventory data is, for example, data indicating a building (for example, a building name) in which the server associated with the physical inventory data is arranged.

The floor number data included in the physical inventory data is, for example, data indicating a floor number at which the server associated with the physical inventory data is arranged.

The rack data included in the physical inventory data is, for example, an identifier of a rack in which the server associated with the physical inventory data is arranged.

The specification data included in the physical inventory data is, for example, data indicating the specifications of the server associated with the physical inventory data. The specification data indicates, for example, the number of cores, the memory capacity, and the hard disk capacity.

The network data included in the physical inventory data is, for example, data indicating information relating to a network of the server associated with the physical inventory data. The network data indicates, for example, an NIC included in the server, the number of ports included in the NIC, and a port ID of each of the ports.

The operating container ID list included in the physical inventory data is, for example, data indicating information relating to one or a plurality of containers operating in the server associated with the physical inventory data. The operating container ID list indicates, for example, a list of identifiers (container IDs) of instances of the containers.

The cluster ID included in the physical inventory data is, for example, an identifier of a cluster (for example, Kubernetes cluster) to which the server associated with the physical inventory data belongs.

The logical inventory data includes topology data for a plurality of elements included in the communication system 1, which indicates the current status of such link between the elements as illustrated in FIG. 4. For example, the logical inventory data includes topology data including an identifier of a certain NS and an identifier of one or a plurality of NEs under the control of the certain NS. In addition, for example, the logical inventory data includes topology data including an identifier of a certain network slice and an identifier of one or a plurality of NEs belonging to the certain network slice.

The inventory data may also include data indicated by the current status of, for example, a geographical relationship or a topological relationship between the elements included in the communication system 1. As described above, the inventory data includes location data indicating locations at which the elements included in the communication system 1 are operating, that is, the current locations of the elements included in the communication system 1. It can be said therefrom that the inventory data indicates the current status of the geographical relationship between the elements (for example, geographical closeness between the elements).

The logical inventory data may also include NSI data indicating information relating to a network slice. The NSI data indicates, for example, attributes such as an identifier of an instance of the network slice and the type of the network slice. The logical inventory data may also include NSSI data indicating information relating to a network slice subnet. The NSSI data indicates, for example, attributes such as an identifier of an instance of the network slice subnet and the type of the network slice subnet.

The logical inventory data may also include NS data indicating information relating to an NS. The NS data indicates, for example, attributes such as an identifier of an instance of the NS and the type of the NS. The logical inventory data may also include NF data indicating information relating to an NF. The NF data indicates, for example, attributes such as an identifier of an instance of the NF and the type of the NF. The logical inventory data may also include CNFC data indicating information relating to a CNFC. The CNFC data indicates, for example, attributes such as an identifier of an instance and the type of the CNFC. The logical inventory data may also include pod data indicating information relating to a pod included in the CNFC. The pod data indicates, for example, attributes such as an identifier of an instance of the pod and the type of the pod. The logical inventory data may also include container data indicating information relating to a container included in the pod. The container data indicates, for example, attributes such as a container ID of an instance of the container and the type of the container.

With the container ID of the container data included in the logical inventory data and the container ID included in the operating container ID list included in the physical inventory data, an instance of the container and the server on which the instance of the container is operating become linked to each other.

Further, data indicating various attributes such as the host name and the IP address may be included in the above-mentioned data included in the logical inventory data. For example, the container data may include data indicating the IP address of a container corresponding to the container data. Further, for example, the NF data may include data indicating the IP address and the host name of an NF indicated by the NE data.

The logical inventory data may also include data indicating NSSAI including one or a plurality of pieces of S-NSSAI, which is set for each NF.

Further, the inventory database 82 can appropriately grasp the resource status in cooperation with the container manager 78. Then, the inventory database 82 appropriately updates the inventory data stored in the inventory database 82 based on the latest resource status.

Further, for example, the inventory database 82 updates the inventory data stored in the inventory database 82 in accordance with execution of an action, such as construction of a new element included in the communication system 1, a change of a configuration of the elements included in the communication system 1, scaling of the elements included in the communication system 1, or replacement of the elements included in the communication system 1.

The service catalog storage 64 stores service catalog data. The service catalog data may include, for example, service template data indicating the logic to be used by the life cycle manager 94 or the like. This service template data includes information required for constructing the network service. For example, the service template data includes information defining the NS, the NE, and the CNFC and information indicating an NS-NF-CNFC correspondence relationship. Further, for example, the service template data contains a workflow script for constructing the network service.

An NS descriptor (NSD) is an example of the service template data. The NSD is associated with a network service, and indicates, for example, the types of a plurality of functional units (for example, a plurality of CNFs) included in the network service. The NSD may indicate the number of CNEs or other functional units included in the network service for each type thereof. The NSD may also indicate a file name of a CNED described later, which relates to the CNF included in the network service.

Further, a CNF descriptor (CNFD) is an example of the above-mentioned service template data. The CNFD may indicate computer resources (for example, CPU, memory, and hard disk drive) required by the CNF. For example, the CNFD may also indicate, for each of a plurality of containers included in the CNF, computer resources (such as CPU, memory, and hard disk drive) required by the container.

The service catalog data may also include information to be used by the policy manager 90, the information relating to a threshold value (for example, threshold value for abnormality detection) to be compared to the calculated performance index value. The performance index value is described later.

The service catalog data may also include, for example, slice template data. The slice template includes information required for executing instantiation of the network slice, and includes, for example, the logic to be used by the slice manager 92.

The slice template data includes information on a "generic network slice template" defined by the GSM Association (GSMA) ("GSM" is a trademark). Specifically, the slice template data includes network slice template data (NST), network slice subnet template data (NSST), and network service template data. The slice template data also includes information indicating the hierarchical structure of those elements which is illustrated in FIG. 4.

In this embodiment, for example, the life cycle manager 94 constructs a new network service for which a purchase request has been made in response to the purchase request for the NS by the purchaser.

The life cycle manager 94 may execute, for example, the workflow script associated with the network service to be purchased in response to the purchase request. Then, the life cycle manager 94 may execute this workflow script, to thereby instruct the container manager 78 to deploy the container included in the new network service to be purchased. Then, the container manager 78 may acquire the container image of the container from the repository 80 and deploy a container corresponding to the container image in the server.

In addition, in this embodiment, the life cycle manager 94 executes, for example, scaling or replacement of the element included in the communication system 1. In this case, the life cycle manager 94 may output a container deployment instruction or deletion instruction to the container manager 78. Then, the container manager 78 may execute, for example, a process for deploying a container or a process for deleting a container in accordance with the instruction. In this embodiment, the life cycle manager 94 can execute such scaling and replacement that cannot be handled by Kubernetes of the container manager 78 or other tools.

The life cycle manager 94 may also output an instruction to create a communication route to the SDN controller 74. For example, the life cycle manager 94 presents, to the SDN controller 74, two IP addresses at both ends of a communication route to be created, and the SDN controller 74 creates a communication route connecting those two IP addresses to each other. The created communication route may be managed so as to be linked to those two IP addresses.

The life cycle manager 94 may also output to the SDN controller 74 an instruction to create a communication route between two IP addresses linked to the two IP addresses.

In this embodiment, the slice manager 92 executes, for example, instantiation of a network slice. In this embodiment, the slice manager 92 executes, for example, instantiation of a network slice by executing the logic indicated by the slice template stored in the service catalog storage 64.

The slice manager 92 includes, for example, a network slice management function (NSMF) and a network slice sub-network management function (NSSMF) described in the third generation partnership project (3GPP) (trademark) specification "TS28 533." The NSMF is a function for generating and managing network slices, and provides an NSI management service. The NSSMF is a function for generating and managing network slice subnets forming a part of a network slice, and provides an NSSI management service.

The slice manager 92 may output to the configuration manager 76 a configuration management instruction related to the instantiation of the network slice. Then, the configuration manager 76 may execute configuration management such as settings in accordance with the configuration management instruction.

The slice manager 92 may also present, to the SDN controller 74, two IP addresses to output an instruction to create a communication route between those two IP addresses.

In this embodiment, for example, the configuration manager 76 executes configuration management such as settings of the element group including the NEs in accordance with the configuration management instruction received from the life cycle manager 94 or the slice manager 92.

In this embodiment, for example, the SDN controller 74 creates the communication route between the two IP addresses linked to the creation instruction in accordance the instruction to create the communication route, which has been received from the life cycle manager 94 or the slice manager 92. The SDN controller 74 may create a communication route between two IP addresses through use of, for example, a publicly known path calculation method such as Flex Algo.

In this case, for example, the SDN controller 74 may use segment routing technology (for example, segment routing IPv6 (SRv6)) to construct an NSI and NSSI for the server or an aggregation router present between communication routes. The SDN controller 74 may also generate an NSI and NSSI extending over a plurality of NEs to be set by issuing, to the plurality of NEs to be set, a command to set a common virtual local area network (VLAN) and a command to assign a bandwidth and a priority indicated by the setting information to the VLAN.

The SDN controller 74 may change the maximum value of the bandwidth that can be used for communication between two IP addresses without constructing a network slice.

The platform system 30 in this embodiment may include a plurality of SDN controllers 74. Each of the plurality of SDN controllers 74 may execute a process such as the creation of a communication route for a network device group including the AGs associated with the SDN controller 74.

In this embodiment, the monitor 72 monitors, for example, the element group included in the communication system 1 based on a given management policy. In this case, for example, the monitor 72 may monitor the element group based on a monitoring policy designated by the purchaser when the purchaser purchases the network service.

In this embodiment, the monitor 72 executes monitoring at various levels, such as a slice level, an NS level, an NF level, a CNFC level, and a level of hardware such as the server.

For example, the monitor 72 may set a module for outputting metric data in the hardware such as the server, or a software element included in the communication system 1 so that monitoring can be performed at the various levels described above. In this case, for example, the NF may output the metric data indicating a metric that can be measured (can be identified) by the NE to the monitor 72. Further, the server may output the metric data indicating a metric relating to the hardware that can be measured (can be identified) by the server to the monitor 72.

In addition, for example, the monitor 72 may deploy, in the server, a sidecar container for aggregating the metric data indicating the metrics output from a plurality of containers in units of CNFCs (microservices). This sidecar container may include an agent called "exporter." The monitor 72 may repeatedly execute a process for acquiring the metric data aggregated in units of microservices from the sidecar container, at predetermined monitoring intervals through use of a mechanism of a monitoring tool, for example, Prometheus capable of monitoring the container management tool such as Kubernetes.

The monitor 72 may monitor performance index values regarding performance indices described in, for example, "TS 28.552, Management and orchestration; 5G performance measurements" or "TS 28.554, Management and orchestration; 5G end to end Key Performance Indicators (KPI)." Then, the monitor 72 may acquire metric data indicating the performance index values to be monitored.

In this embodiment, for example, the monitor 72 executes a process (enrichment) for aggregating metric data in predetermined units of aggregation to generate performance index value data indicating the performance index values of the elements included in the communication system 1 in the units of aggregation.

For example, for one gNB, the metric data indicating the metrics of the elements under control of the qNB (for example, network nodes such as DUs 42 and CUs 44) is aggregated to generate the performance index value data of the qNB. In this way, performance index value data indicating a communication performance in the area covered by the qNB is generated. For example, performance index value data indicating a plurality of types of communication performance, such as traffic amount (throughput) and latency, may be generated in each qNB. However, the communication performance indicated by the performance index value data is not limited to traffic amount and latency.

The monitor 72 outputs the performance index value data generated by the above-mentioned enrichment to the data bus 68.

In this embodiment, for example, the data bus 68 receives the performance index value data output from the monitor 72. Based on the received one or a plurality of pieces of performance index value data, the data bus 68 generates a performance index value file including the one or a plurality of pieces of performance index value data. The data bus 68 then outputs the generated performance index value file to the big-data platform 66.

Further, the elements such as the network slice, the NS, the NF, the CNFC that are included in the communication system 1 and the hardware such as the server notify the monitor 72 of various alerts (for example, notify the monitor 72 of an alert with the occurrence of a failure as a trigger).

Then, for example, when the monitor 72 receives the above-mentioned notification of the alert, the monitor 72 outputs alert message data indicating the notification to the data bus 68. Then, the data bus 68 generates an alert file in which alert message data indicating one or a plurality of notifications are compiled into one file, and outputs the generated alert file to the big-data platform 66.

In this embodiment, the big-data platform 66 accumulates, for example, the performance index value file and the alert file that have been output from the data bus 68.

In this embodiment, for example, a plurality of trained machine learning models are stored in the AI 70 in advance. The AI 70 uses various machine learning models stored in the AI 70 to execute an estimation process such as a future prediction process for a use status and quality of service of the communication system 1. The AI 70 may generate estimation result data indicating results of the estimation process.

The AI 70 may execute the estimation process based on the files accumulated in the big-data platform 66 and the above-mentioned machine learning model. This estimation process is suitable when prediction of a long-term trend is performed infrequently.

Further, the AI 70 can acquire performance index value data stored in the data bus 68. The AI 70 may execute the estimation process based on the performance index value data stored in the data bus 68 and the above-mentioned machine learning model. This estimation process is suitable when short-term predictions are performed frequently.

In this embodiment, for example, the performance manager 88 calculates, based on a plurality of pieces of metric data, a performance index value (for example, KPI) that is based on metrics indicated by those pieces of metric data. The performance manager 88 may calculate a performance index value (for example, performance index value related to an end-to-end network slice) which is a comprehensive evaluation of a plurality of types of metrics and cannot be calculated from a single piece of metric data. The performance manager 88 may generate comprehensive performance index value data indicating a performance index value being a comprehensive evaluation.

The performance manager 88 may acquire the above-mentioned performance index value file from the big-data platform 66. Further, the performance manager 88 may acquire estimation result data from the AI 70. A performance index value such as a KPI may be calculated based on at least one of the performance index value file or the estimation result data. The performance manager 88 may directly acquire metric data from the monitor 72. Further, the performance index value such as a KPI may be calculated based on the metric data.

In this embodiment, the failure manager 86 detects the occurrence of a failure in the communication system 1 based on, for example, at least any one of the above-mentioned metric data, the above-mentioned notification of the alert, the above-mentioned estimation result data, or the above-mentioned comprehensive performance index value data. The failure manager 86 may detect, for example, the occurrence of a failure that cannot be detected from a single piece of metric data or a single notification of the alert, based on a predetermined logic. The failure manager 86 may also generate detection failure data indicating the detected failure.

The failure manager 86 may directly acquire the metric data and the notification of the alert from the monitor 72. The failure manager 86 may also acquire the performance index value file and the alert file from the big-data platform 66. Further, the failure manager 86 may acquire the alert message data from data bus 68.

In this embodiment, the policy manager 90 executes a predetermined determination process based on, for example, at least any one of the above-mentioned metric data, the above-mentioned performance index value data, the above-mentioned alert message data, the above-mentioned performance index value file, the above-mentioned alert file, the above-mentioned estimation result data, the above-mentioned comprehensive performance index value data, or the above-mentioned detection failure data.

Then, the policy manager 90 may execute an action corresponding to a result of the determination process. For example, the policy manager 90 may output an instruction to construct a network slice to the slice manager 92. The policy manager 90 may also output an instruction for scaling or replacement of the elements to the life cycle manager 94 based on the result of the determination process.

The policy manager 90 in this embodiment can acquire the performance index value data stored in the data bus 68. The policy manager 90 may then execute a predetermined determination process based on the performance index value data acquired from the data bus 68. The policy manager 90 may also execute a predetermined determination process based on the alert message data stored in the data bus 68.

In this embodiment, the ticket manager 84 generates, for example, a ticket indicating information to be notified to an administrator of the communication system 1. The ticket manager 84 may generate a ticket indicating details of the detection failure data. The ticket manager 84 may also generate a ticket indicating a value of the performance index value data or the metric data. The ticket manager 84 may also generate a ticket indicating a determination result obtained by the policy manager 90.

Then, the ticket manager 84 notifies the administrator of the communication system 1 of the generated ticket. The ticket manager 84 may send, for example, an email to which the generated ticket is attached to an email address of the administrator of the communication system 1.

The generation of the performance index value file, the determination process based on the performance index value data stored in the data bus 68, and the estimation process based on the performance index value data stored in the data bus 68 are further described in the following.

Figure 7:
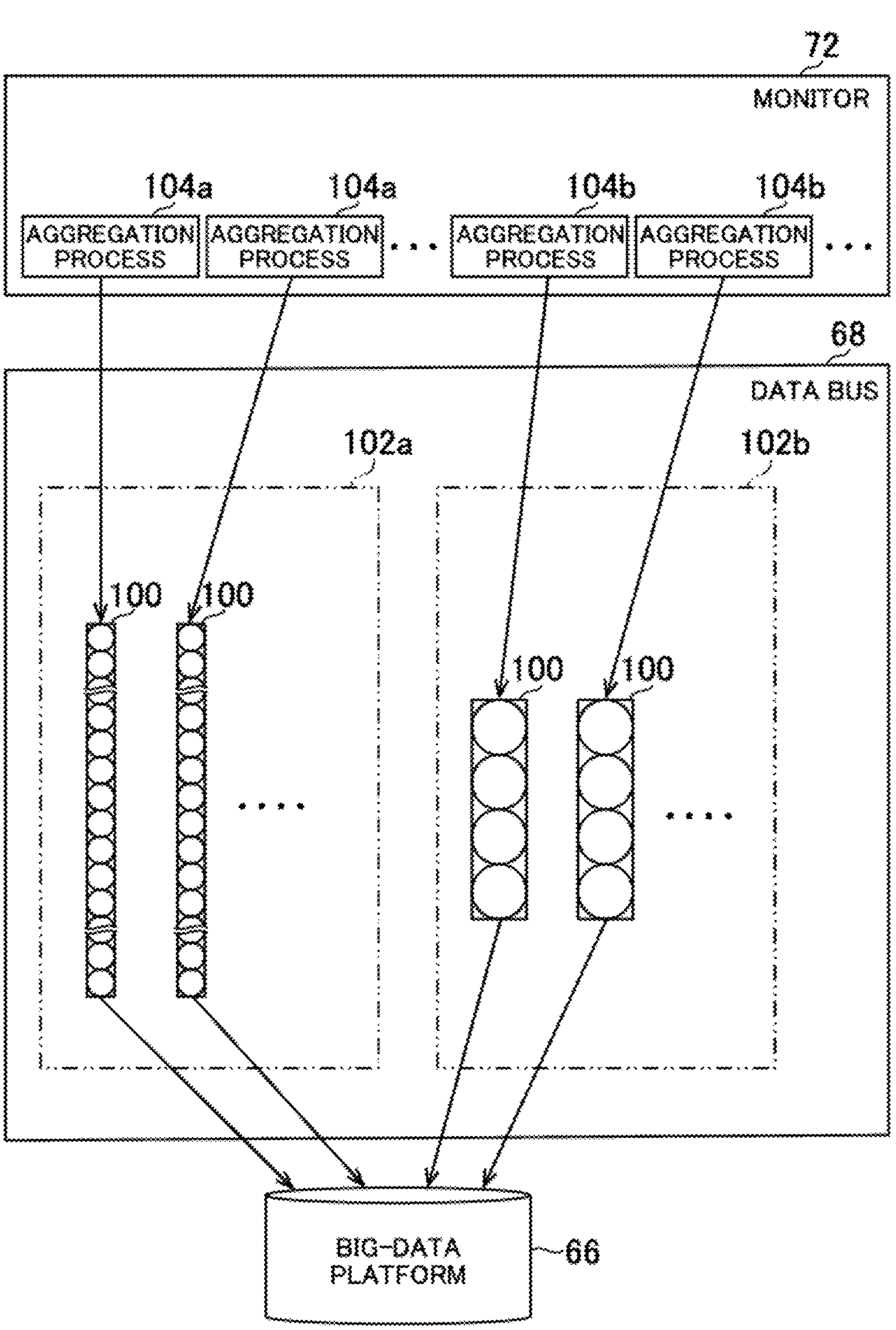
FIG. 7 is a diagram for schematically illustrating an example of a data bus in the one embodiment of the present invention.

FIG. 7 is a diagram for schematically illustrating an example of the data bus 68 in this embodiment. As illustrated in FIG. 7, the data bus 68 in this embodiment includes, for example, a plurality of queues 100 that hold performance index value data in a first-in, first-out list structure.

Each queue 100 belongs to any one of a first queue group 102*a* or a second queue group 102*b*.

In this embodiment, for example, a plurality of aggregation processes 104 are operating in the monitor 72. In each aggregation process 104, the elements to be aggregated in the aggregation process 104 are preset. For example, in each aggregation process 104, the gNBs to be aggregated in the aggregation process 104 are preset. Each aggregation process 104 acquires metric data from the NEs (for example, RUs 40, DUs 42, and CU-UPS 44*b*) under the control of the gNBs to be aggregated in the aggregation process 104. Further, the aggregation process 104 executes an enrichment process for generating performance index value data indicating the communication performance of the gNB based on the acquired metric data.

Further, in this embodiment, for example, the aggregation process 104 and the queue 100 are linked in advance. For convenience, in FIG. 7, a case in which the aggregation process 104 and the queue 100 are linked in a one-to-one relationship is illustrated, but the aggregation process 104 and the queue 100 may be linked in a many-to-many relationship.

The aggregation processes 104 linked to the queues 100 included in the first queue group 102*a* are hereinafter referred to as "first group aggregation processes 104*a*." Further, the aggregation processes 104 linked to the queues 100 included in the second queue group 102*b* are hereinafter referred to as "second group aggregation processes 104*b*."

At predetermined time intervals (for example, every minute), each first group aggregation process 104*a* generates performance index value data by aggregating the metric data associated with the first group aggregation process 104*a* from the previous aggregation to the present time.

The first group aggregation process 104*a* acquires the metric data from one or a plurality of NEs associated with the first group aggregation process 104*a* at intervals of, for example, one minute. Then, the first group aggregation process 104*a* generates performance index value data for the aggregation period by aggregating the metric data for the same aggregation period.

Each time the first group aggregation process 104*a* generates performance index value data, the first group aggregation process 104*a* enqueues the performance index value data into one or a plurality of queues 100 linked to the first group aggregation process 104*a*.

At predetermined time intervals (for example, every fifteen minutes), each second group aggregation process 104*b* generates performance index value data by aggregating the metric data associated with the second group aggregation process 104*b* from the previous aggregation to the present time.

The second group aggregation process 104*b* acquires the metric data from one or a plurality of NEs associated with the second group aggregation process 104*b* at intervals of, for example, fifteen minutes. Then, the second group aggregation process 104*b* generates performance index value data for the aggregation period by aggregating the metric data for the same aggregation period.

Each time the second group aggregation process 104*b* generates performance index value data, the second group aggregation process 104*b* enqueues the performance index value data into one or a plurality of queues 100 linked to the second group aggregation process 104*b*.

In this embodiment, the maximum number of pieces of performance index value data that is storable in the queues 100 included in the first queue group 102*a* is determined in advance. In this case, for example, it is assumed that a maximum of 240 pieces of performance index value data is storable in the queues 100. That is, the maximum number is "240."

Further, in this embodiment, the maximum number of pieces of performance index value data that is storable in the queues 100 included in the second queue group 102*b* is determined in advance. In this case, for example, it is assumed that a maximum of four pieces of performance index value data is storable in the queues 100. That is, the maximum number is "4."

In this embodiment, for example, a plurality of determination processes 106 (see FIG. 8 and FIG. 9) are operating in the policy manager 90. A part of those determination processes 106 execute determination processes based on the performance index value data stored in the data bus 68, and the rest of the determination processes 106 execute determination processes based on files stored in the big-data platform 66.

The determination processes 106 in this embodiment include a process for acquiring performance index value data indicating an actual result value of the performance index value related to the communication system 1. For example, there is determination process 106 for acquiring performance index value data in response to the performance index value data being enqueued in a queue 100 included in the first queue group 102*a*.

In this embodiment, the queues 100 included in the first queue group 102*a* are configured so that the performance index value data can be accessed (acquired) without dequeuing any of the performance index value data included in the queue 100.

The determination process 106 determines the status of the communication system 1 based on the acquired performance index value data. In this case, for example, the status of the elements which are included in the communication system 1 and are associated with the determination process 106 may be determined. For example, the status of the elements to be aggregated in the first group aggregation process 104*a* which has generated the performance index value data to be acquired by the determination process 106 may be determined. Such a determination process 106 is hereinafter referred to as "actual result determination process 106*a*."

In this embodiment, for example, the actual result determination process 106*a* and the queue 100 are linked in advance. For convenience, in FIG. 8 and FIG. 9, a case in which the actual result determination process 106*a* and the queue 100 are linked in a one-to-one relationship is illustrated, but the actual result determination process 106*a* and the queue 100 may be linked in a many-to-many relationship.

In this case, for example, in response to performance index value data being enqueued in a queue 100 included in the first queue group 102*a*, the data bus 68 may output a notification indicating that the performance value data has been enqueued to one or a plurality of actual result determination processes 106*a* linked to the queue 100.

The actual result determination process 106*a* which has received the notification may acquire, in response to the reception of the notification, the latest performance index value data stored in the queue 100.

Further, the determination processes 106 in this embodiment include a process for acquiring estimation result data indicating an estimation result obtained by an estimation process 108 (see FIG. 9) linked to the determination process

106. The determination process 106 determines the status of the communication system 1 based on the acquired estimation result data. In this case, for example, the status of the elements which are included in the communication system 1 and are associated with the determination process 106 may be determined. For example, the status of the elements to be aggregated in the first group aggregation process 104*a* which has generated the performance index value data to be acquired by the estimation process 108 may be determined. Such a determination process 106 is hereinafter referred to as "prediction determination process 106*b*."

Further, in this embodiment, for example, a plurality of estimation processes 108 (see FIG. 9) are operating in the AI 70. A part of those estimation processes 108 execute estimation processes based on the performance index value data stored in the data bus 68, and the rest of the estimation processes 108 execute estimation processes based on files stored in the big-data platform 66.

Further, in this embodiment, for example, the estimation process 108 and the queue 100 are linked in advance. For convenience, in FIG. 8, a case in which the estimation process 108 and the queue 100 are linked in a one-to-one relationship is illustrated, but the estimation process 108 and the queue 100 may be linked in a many-to-many relationship.

In this embodiment, for example, each estimation process 108 acquires the performance index value data stored in the queue 100 which corresponds to the estimation process 108 and which is included in the first queue group 102*a*. The estimation processes execute the estimation process determined in advance for the relevant estimation process 108 based on the performance index value data.

In this case, for example, in response to performance index value data being enqueued in a queue 100 included in the first queue group 102*a*, the estimation process 108 acquires a predetermined number of most recent pieces of the performance index value data or the performance index value data of a most recent predetermined period including at least the latest performance index value data among the performance index value data stored in the queue 100.

In this case, for example, in response to performance index value data being enqueued in a queue 100 included in the first queue group 102*a*, the data bus 68 may output a notification indicating that the performance index value data has been enqueued to one or a plurality of estimation processes 108 linked to the queue 100.

When the estimation process 108 receives the notification, in response to the received notification, the estimation process 108 may acquire a predetermined number of most recent pieces of the performance index value data or the performance index value data of a most recent predetermined period including at least the latest performance index value data among the performance index value data stored in the queue 100.

Figure 9:
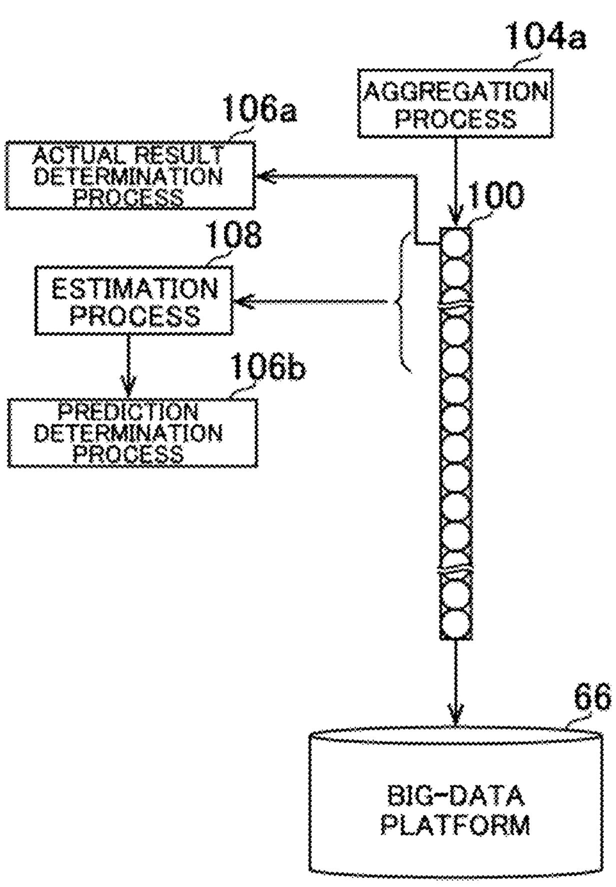
FIG. 9 is a diagram for schematically illustrating an example of acquisition of the performance index value data by the actual result determination process and an estimation process.

In this case, for example, the estimation process 108 illustrated in FIG. 9 acquires 60 pieces of performance index value data, including the latest performance index value data. Those pieces of performance index value data correspond to the most recent 60 minutes of performance index value data, including the latest performance index value data. The estimation process 108 then executes the estimation process based on the acquired performance index value data.

For example, the first group aggregation process 104*a* associated with a certain specific qNB generates performance index value data related to the qNB by aggregating the metric data related to the elements included in the qNB (for example, elements under the control of the qNB). In response to the performance index value data being enqueued in the queue 100, the estimation process 108 which acquires the performance index value data generated by the first group aggregation process 104*a* acquires 60 pieces of performance index value data including the latest performance index value data stored in the queue 100.

In this case, the estimation process 108 uses a trained machine learning model stored in advance in the AI 70 to predict the level of the network load of the qNB from the current time to 20 minutes after the current time based on those 60 pieces of performance index value data. In this case, a prediction of the traffic amount (throughput) or latency, for example, may be executed as the level of the network load of the qNB.

The machine learning model may be, for example, an existing prediction model. Further, for example, the machine learning model may be a trained machine learning model in which supervised learning using a plurality of training data elements has been executed in advance. In this case, each of those plurality of training data elements may include, for example, for given time points different from each other, learning input data indicating the traffic amount in the qNB for 60 minutes until the time point and teacher data indicating the level of the network load (for example, traffic amount or latency) of the qNB from the time point until 20 minutes after the time point.

It is not required that the estimation process 108 acquire a part of the performance index value data stored in the queue 100 as described above, and the estimation process 108 may acquire all the performance index value data stored in the queue 100.

Then, the estimation process 108 outputs estimation result data indicating the execution result (estimation result) of the estimation process to the prediction determination process 106*b* linked to the estimation process 108. The prediction determination process 106*b* then acquires the estimation result data, and then determines the status of the communication system 1 based on the acquired estimation result data.

As described above, the queue 100 in this embodiment is linked to the aggregation process 104, the actual result determination process 106*a*, the prediction determination process 106*b*, and the estimation process 108.

Further, in this embodiment, for example, the data bus 68 generates a performance index value file including at least a part of the performance index value data stored in the queue 100 at a frequency lower than the frequency at which the AI 70 acquires the performance index value data.

For example, the data bus 68 may generate, at predetermined time intervals, a performance index value file including the performance index value data stored in the queue 100 after a previous timing of generation of the performance index value file.

In this case, the time interval may or may not match the time (60 minutes in the above example) corresponding to the maximum number of pieces of performance index value data that is storable in the queues 100 included in the first queue group 102*a*.

Further, for example, the data bus 68 may generate a file including all the performance index value data stored in the queue 100 in response to dequeuing of all the performance index value data included in the generated performance index value file. That is, the file including all the performance index value data stored in the queue 100 may be generated in response to the replacement of all the performance index value data stored in the queue 100.

Further, in this embodiment, in a case in which 60 pieces of performance index value data are stored in a queue 100 included in the first queue group 102*a*, when new performance index value data is enqueued, the oldest performance index value data stored in the queue 100 is dequeued. That is, the oldest performance index value data stored in the queue 100 is erased from the queue 100.

In this embodiment, when four pieces of performance index value data are stored in a queue 100 included in the second queue group 102*b*, the data bus 68 generates a performance index value file in which those four pieces of performance index value data are consolidated into one file. The data bus 68 then outputs the generated performance index value file to the big-data platform 66.

The data bus 68 dequeues all the performance index value data stored in the queue 100. That is, all the performance index value data stored in the queue 100 is erased from the queue 100.

In this way, the process executed in response to the generation of the performance index value file is different for the queues 100 included in the first queue group 102*a* from that for the queues 100 included in the second queue group 102*b*. For the queues 100 included in the second queue group 102*b*, all the performance index value data stored in a queue 100 is erased from the queue 100 in response to the generation of the performance index value file. Meanwhile, for the queues 100 included in the first queue group 102*a*, dequeuing in response to the generation of the performance index value file is not executed.

In this embodiment, for example, the purchaser of the network service can select an option related to a monitoring setting when purchasing the network service. In the following description, it is assumed that the purchaser of the network service can select any one of a low-level option, a medium-level option, and a high-level option.

In this case, for example, in a case in which the low-level option has been selected, when the network service is constructed, not only the element included in the network service, but as illustrated in FIG. 7, queues 100 linked to the element and aggregation processes 104 linked to the element are also generated. In this case, performance index value files related to the element included in the network service are accumulated in the big-data platform 66.

Figure 8:
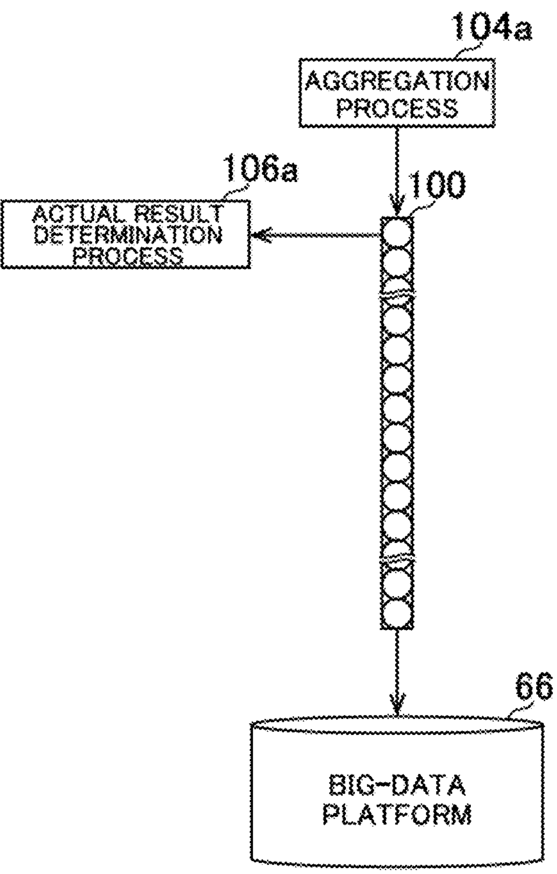
FIG. 8 is a diagram for schematically illustrating an example of acquisition of performance index value data by an actual result determination process.

Further, for example, in a case in which the medium-level option has been selected, when the network service is constructed, not only the element included in the network service, but in the same manner as in the low-level option, the queues 100 linked to the element and the aggregation processes 104 linked to the element are also generated. In addition, as illustrated in FIG. 8, an actual result determination process 106*a* linked to the queue 100 is also generated.

At this time, the policy manager 90 may refer to the inventory data to confirm an attribute of the element associated with the generated actual result determination process 106*a*. The policy manager 90 may then generate an actual result determination process 106*a* in which a workflow corresponding to the confirmed attribute is set. Further, the actual result determination process 106*a* may execute the determination process by executing the workflow set for the actual result determination process 106*a*.

For example, the actual result determination process 106*a* may determine whether or not scale-out is required based on the acquired performance index value data.

In this embodiment, for example, the platform system 30 may execute scale-out of the element included in the communication system 1 in response to a determination that scale-out is required. For example, the policy manager 90, the life cycle manager 94, the container manager 78, and the configuration manager 76 may cooperate with each other to execute scale-out. For example, the scale-out of the DUs 42 or CU-UPS 44*b* included in a certain specific gNB may be executed based on the performance index value data related to the certain specific qNB in response to the determination that the scale-out is required.

For example, the actual result determination process 106*a* may determine whether or not the acquired performance index value data satisfies a predetermined first scale-out condition. In this case, it may be determined whether or not the performance index value indicated by the performance index value data exceeds a threshold value th1. This performance index value may be a value indicating the level of the network load, such as the traffic amount (throughput) or latency. When it is determined that the first scale-out condition is satisfied (for example, when it is determined that the performance index value exceeds the threshold value th1), scale-out of the elements included in the communication system 1 may be executed.

Further, for example, in a case in which the high-level option has been selected, when the network service is constructed, not only the element included in the network service, but in the same manner as in the low-level option and the medium-level option, the queues 100 linked to the element, the aggregation processes 104 linked to the element, and the actual result determination process 106*a* linked to the queue 100 are also generated.

Further, as illustrated in FIG. 9, the AI 70 generates an estimation process 108 linked to the actual result determination process 106*a*, and the policy manager 90 generates a prediction determination process 106*b* linked to the actual result determination process 106*a*. In this case, for example, the estimation process 108 and the prediction determination process 106*b* may be activated. At this time, instantiation of a trained machine learning model may also be executed. The estimation process 108 may then execute the estimation using the instantiated machine learning model.

Then, the prediction determination process 106*b* may execute a predetermined determination process based on the estimation result data output by the estimation process 108 linked to the prediction determination process 106*b*. For example, the prediction determination process 106*b* may determine whether or not scale-out is required based on the network load prediction result.

In this embodiment, for example, as illustrated in FIG. 9, in response to performance index value data being enqueued in a queue 100 included in the first queue group 102*a*, the actual result determination process 106*a* may acquire the enqueued performance index value data, and the estimation process 108 may acquire, of the performance index value data stored in the queue 100, a predetermined number of most recent pieces of the performance index value data or the performance index value data of a most recent predetermined period including at least the enqueued performance index value data. In this way, in response to performance index value data being enqueued in a queue 100, the enqueued performance index value data may be acquired by both the actual result determination process 106*a* and the estimation process 108.

Then, the actual result determination process 106*a* may determine whether or not scale-out is required based on the acquired performance index value data.

Further, the estimation process 108 may generate estimation result data indicating the network load prediction result based on the acquired performance index value data. The estimation process 108 may then output the generated estimation result data to the prediction determination process 106*b*. The prediction determination process 106*b* may acquire the estimation result data.

Then, the prediction determination process 106*b* may determine whether or not scale-out is required based on the acquired estimation result data.

It is not required that the AI 70 generate the estimation process 108 and that the policy manager 90 generate the prediction determination process 106*b*. For example, the actual result determination process 106*a* may generate the estimation process 108 and the prediction determination process 106*b*.

In this embodiment, for example, the platform system 30 executes scale-out of the elements included in the communication system 1 in response to a determination that scale-out is required.

For example, the prediction determination process 106*b* may determine whether or not the predicted value of the network load indicated by the estimation result data satisfies predetermined second scale-out condition. For example, it may be determined whether or not the predicted value exceeds a threshold value th2. In this case, for example, it may be determined whether or not, among a plurality of predicted values from the current time to 20 minutes after the current time, there is a predicted value which exceeds the threshold value th2. The predicted value may be a value indicating the level of the network load, such as the traffic amount (throughput) or latency. Scale-out of the element included in the communication system 1 may be executed in response to a determination that a second scale-out condition is satisfied. The second scale-out condition may be the same as or different from the first scale-out condition described above.

Further, in this embodiment, when the purchaser of the network service selects the medium-level option, an element included in the communication system 1 may be specified. Further, an actual result determination process 106*a* for the specified element may be generated.

Further, in this embodiment, when the purchaser of the network service selects the high-level option, an element included in the communication system 1 may be specified. Further, an actual result determination process 106*a*, an estimation process 108, and a prediction determination process 106*b* for the specified element may be generated.

Further, when the high-level option is selected, an actual result determination process 106*a* may not be generated. Moreover, the option related to the monitoring setting may be changed in response to a request by the purchaser.

In this embodiment, for example, the AI 70 determines at least one machine learning model among a plurality of machine learning models to be used for a given prediction purpose related to the communication system 1 (for example, at least one machine learning model suitable for the communication system 1).

The process for determining the machine learning model is now further described.

In the following description, it is assumed that the network service purchased by the purchaser has been operating for a certain length of time, and the performance index value files for the elements included in the network service have been accumulated in the big-data platform 66 in advance.

In addition, it is assumed that, in the communication system 1 in this embodiment, for each of a plurality of given prediction purposes, the AI 70 stores a plurality of machine learning models to be used for the prediction purpose, and those machine learning models are in instantiable state.

Figure 10:
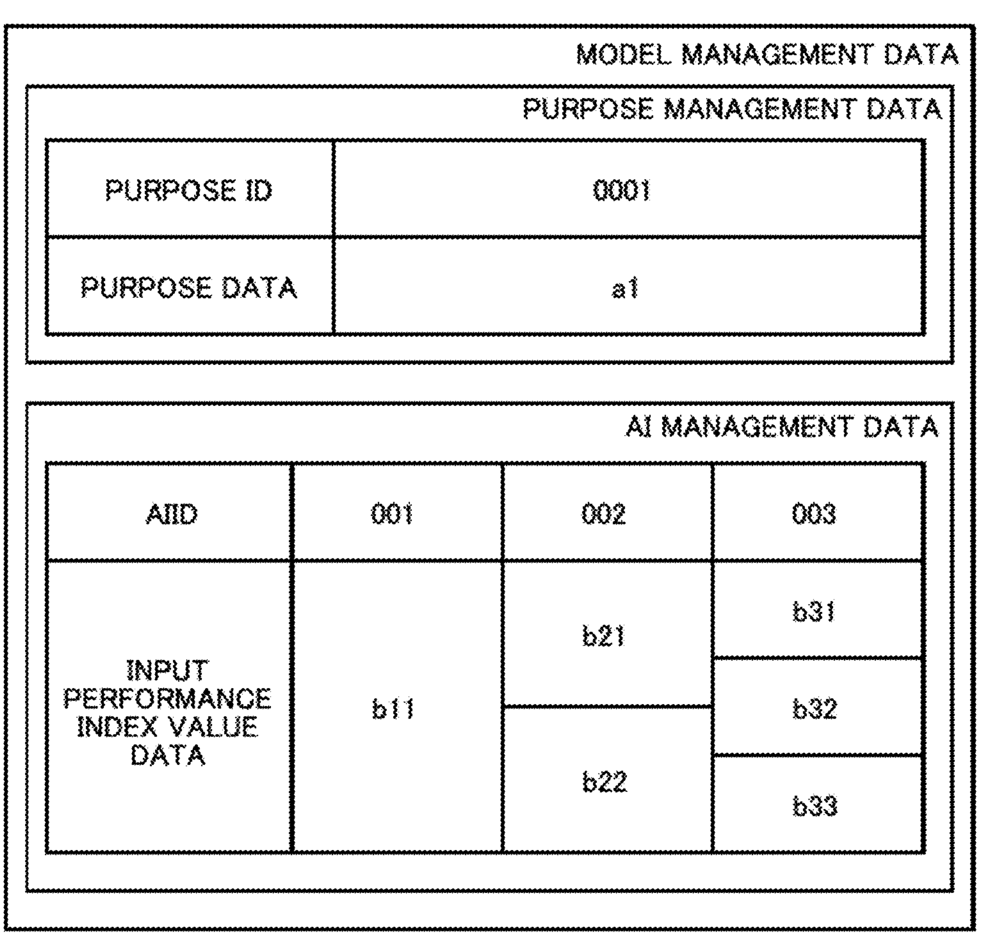
FIG. 10 is a diagram for illustrating an example of model management data.

It is also assumed that the inventory database 82 or the AI 70 stores model management data exemplified in FIG. 10, which is data for managing those machine learning models.

In FIG. 10, model management data associated with one prediction purpose is illustrated. In this embodiment, for example, the inventory database 82 or the AI 70 stores, for each of a plurality of prediction purposes, the model management data associated with the prediction purpose.

As illustrated in FIG. 10, the model management data includes purpose management data and AI management data.

The purpose management data included in the model management data is data associated with the prediction purpose described above. As illustrated in FIG. 10, the purpose management data includes, for example, a purpose ID and purpose data. The purpose ID included in the purpose management data is, for example, an identifier of the prediction purpose associated with the purpose management data. The purpose data included in the purpose management data is, for example, data indicating the prediction purpose associated with the purpose management data. In the purpose management data illustrated in FIG. 10, the prediction purpose indicated by the purpose data is represented as "a1."

The machine learning model in this embodiment may output a predicted value of at least one type of performance index value. The purpose data may indicate the type of the predicted performance index value. For example, the purpose data may indicate the type of a performance index value which is the predicted value output by the machine learning model. Specifically, for example, the value of the purpose data may be "throughput," "latency," "number of registrations," "number of completed connections," "number of active users," and the like.

Further, the purpose data may indicate a prediction purpose related to a specific type of element included in the communication system 1, such as "UPF throughput" (for example, the type of element and the type of performance index value to be predicted for that type of element).

Further, the purpose data may indicate the types of the values to be calculated based on a plurality of types of performance index values. For example, a calculation formula for calculating a comprehensive performance evaluation value based on throughput and latency may be set in the value of the purpose data.

The AI management data included in the model management data is data for managing the machine learning model to be used for the prediction purpose associated with the model management data. The model management data includes a plurality of pieces of AI data each associated with a different machine learning model. The AI data includes an AI ID and one or a plurality of pieces of input performance index value data.

For example, when three machine learning models having a prediction purpose of "a1" are prepared, as illustrated in FIG. 10, three pieces of AI data are included in the model management data. The number of machine learning models to be used for one prediction purpose is not limited to three.

The AI ID included in the AI data is an identifier of the machine learning model to be used for the prediction purpose associated with the model management data. In the example of FIG. 10, the AI IDs of the three machine learning models having the prediction purpose of "a1" are "001," "002," and "003."

The input performance index value data included in the AI data is data indicating the type of performance index value to be input to the machine learning model associated with the AI data. In this embodiment, for example, the AI data associated with the machine learning model includes the same number of pieces of input performance index value data as the number of performance index values to be input to the machine learning model.

In the example of FIG. 10, it is illustrated that the type of performance index value to be input to the machine learning model having the AI ID of "001" is "b11." Further, the types of performance index values to be input to the machine learning model having the AI ID "002" are "b21" and "b22," and the types of performance index values to be input to the machine learning model having the AI ID "003" are "b31," "b32," and "b33."

In this way, the number of types of performance index values to be input to the machine learning model may differ depending on the machine learning model. Further, in the example of FIG. 10, there is illustrated a case in which the number of types of performance index values to be input to the machine learning model is 1 to 3, but the number of types of performance index values to be input to the machine learning model may be 4 or more.

Further, the type of performance index value to be input to a certain machine learning model may be included in the type of performance index value to be input to another machine learning model. Moreover, a part of the types of performance index values to be input to a certain machine learning model may overlap with a part of the types of performance index values to be input to another machine learning model. For example, "b11" and "b21" may be the same type of performance index value.

Further, in this embodiment, the type of performance index value indicated by the input performance index value data and the type of performance index value associated with the prediction purpose indicated by the purpose data may be the same or different.

For example, "a1" and "b11" may be the same type of performance index value. For example, a case in which the actual result value of throughput at a certain point in time is input to a machine learning model and the throughput after that point in time is predicted based on the output of the machine learning model corresponds to a case in which the type of performance index value indicated by the input performance index value data and the type of performance index value indicated by the purpose data are the same.

Specific examples of types of performance index values to be input include "throughput," "latency," "number of registrations," "number of completed connections," and "number of active users."

In this case, the input performance index value data may indicate the type of element and the type of performance index for that type of element. For example, when the value performance index value "throughput" for the element "UPF" is input to the machine learning model, the AI data associated with the machine learning model may include the input performance index value data having the value "UPF throughput."

Figure 11:
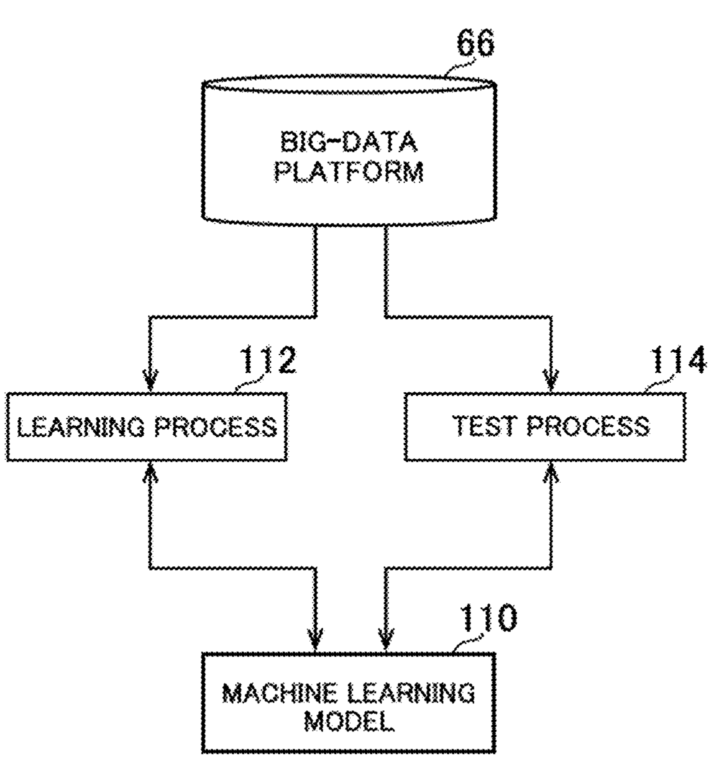
FIG. 11 is a diagram for schematically illustrating an example of a learning process and a test process.

In this embodiment, for example, as illustrated in FIG. 11, the AI 70 instantiates an untrained machine learning model 110 and generates a learning process 112 and a test process 114 associated with the untrained machine learning model 110.

In this case, for example, it is assumed that three untrained machine learning models 110 having the AI IDs "001," "002," and "003" are instantiated. The machine learning models 110 having the AI IDs "001," "002," and "003" are hereinafter referred to as "machine learning model 110*a*," "machine learning model 110*b*," and "machine learning model 110*c*," respectively.

Then, a learning process 112*a* associated with the machine learning model 110*a* and a test process 114*a* associated with the machine learning model 110*a* are generated. Further, a learning process 112*b* associated with the machine learning model 110*b* and a test process 114*b* associated with the machine learning model 110*b* are generated. Further, a learning process 112*c* associated with the machine learning model 110*c* and a test process 114*c* associated with the machine learning model 110*c* are generated.

In this embodiment, as described above, the performance index value files related to the elements included in the network service purchased by the purchaser of the network service are accumulated in the big-data platform 66.

Further, in this embodiment, for example, the AI 70 acquires data indicating a time series of the actual result values of a plurality of types of performance index values related to the communication system 1.

A part of the data acquired in this way corresponds to test data indicating the time series of the actual result values of the plurality of types of performance index values related to the communication system 1. The remainder corresponds to training data indicating the time series of the actual result values of the plurality of types of performance index values related to the communication system 1.

In the following description, it is assumed that the plurality of types include at least "a1," "b11," "b21," "b22," "b31," "b32," and "b33" illustrated in FIG. 10.

In this case, the training data is data different from the test data. For example, the data indicating the performance index values up to a certain time point may be used as the training data, and the data indicating the performance index values after that time point may be used as the test data. As another example, the data indicating the performance index values up to a certain time point may be used as the test data, and the data indicating the performance index values after that time point may be used as the training data.

In this case, for example, the AI 70 acquires at least one performance index value file related to the element included in the network service purchased by the above-mentioned purchaser which is accumulated in the big-data platform 66.

Figure 12:
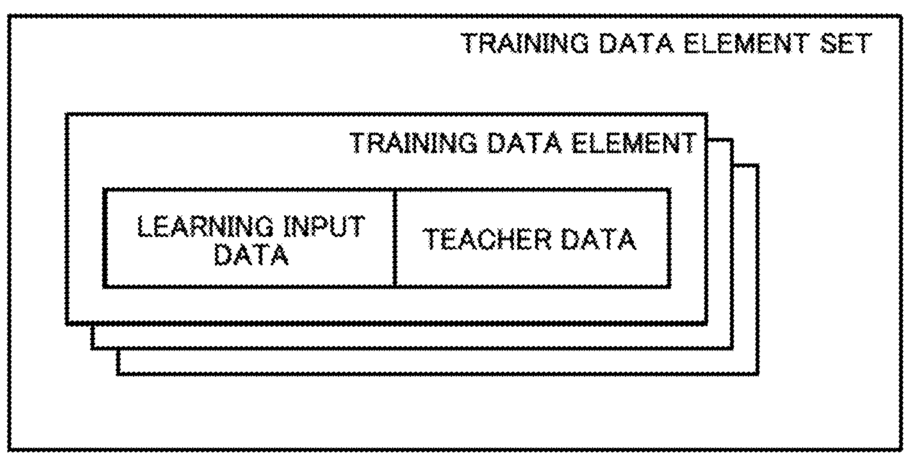
FIG. 12 is a diagram for illustrating an example of a training data element set.

Further, the learning process 112 generates a training data element set illustrated in FIG. 12 based on the training data, which is a part of the data included in the acquired performance index file. As illustrated in FIG. 12, the training data element set includes a plurality of training data elements, and each training data element includes learning input data and teacher data.

In this case, for example, the learning process 112*a* may generate training data elements which include learning input data including the performance index value data having the performance index value type "b11" and teacher data including the performance index value data having the performance index value type "a1," which are included in the performance index value file.

Then, the learning process 112*b* may generate training data data including the elements which include learning input performance index value data having the performance index value type "b21" and the performance index value data having the performance index value type "b22" and teacher data including the performance index value data having the performance index value type "a1," which are included in the performance index value file.

Then, the learning process 112*c* may generate training data elements which include learning input data including the performance index value data having the performance index value type "b31," the performance index value data having the performance index value type "b32," and the performance index value data having the performance index value type "b33" and teacher data including the performance index value data having the performance index value type "a1," which are included in the performance index value file.

Figure 13:
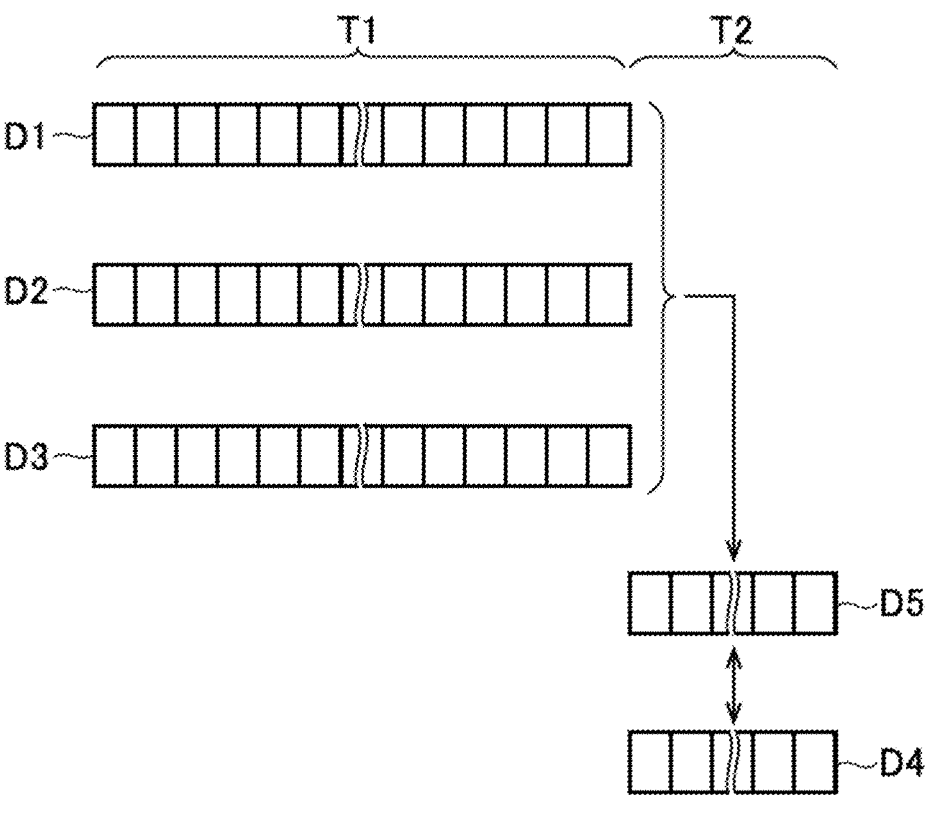
FIG. 13 is a diagram for schematically illustrating an example of training data elements.

FIG. 13 is a diagram for schematically illustrating an example of training data elements generated by the learning process 112*c*. In this case, for example, learning input data including performance index value data D1 indicating the performance index value of the type "b31," performance index value data D2 indicating the performance index value of the type "b32," and performance index value data D3 indicating the performance index value of the type "b33" for a period of a length T1 (for example, 60 minutes) up to a certain reference time point is generated. Further, teacher data D4 including the performance index value data indicating the performance index value of the type "a1" for a period of a length T2 (for example, period from the reference time point to 20 minutes after the reference time point) from the reference time point is generated. Then, a training data element including the learning input data and the teacher data generated in this way is generated.

As a result, a training data element set including a plurality of training data elements generated as described above for various reference time points is generated by the learning process 112*c*.

In the same way, training data element sets are generated by the learning process 112*a* and the learning process 112*b*.

When the machine learning model 110 receives input of performance index value data at a plurality of time points, as illustrated in FIG. 13, the learning input data includes performance index value data for a plurality of time points. Meanwhile, when the machine learning model 110 receives input of performance index value data at one time point, the learning input data includes performance index value data for one time point.

Further, when the machine learning model 110 outputs a predicted value at a plurality of time points, as illustrated in FIG. 13, the teacher data includes performance index value data for a plurality of time points. Meanwhile, when the machine learning model 110 outputs a predicted value at one time point, the teacher data includes performance index value data for one time point.

The learning process 112 generates a trained machine learning model 110 by using the training data element set generated as described above to execute learning of the machine learning model 110 associated with the learning process 112.

For example, as illustrated in FIG. 13, the learning process 112*c* may calculate the value of a given evaluation function (error function) based on an output D5 obtained when the learning input data included in the training data element is input to the machine learning model 110*c* and the teacher data D4 included in the training data element. The learning process 112*c* may then update a parameter of the machine learning model 110*c* based on the calculated evaluation function value. Then, learning of the machine learning model 110*c* may be executed by updating the parameter of the machine learning model 110*c* based on each of the plurality of training data elements included in the training data element set generated by the learning process 112*c*, and as a result, a trained machine learning model 110*c* may be generated.

In the same way, a trained machine learning model 110*a* may be generated by executing learning on the machine learning model 110*a* which uses the training data element set generated by the learning process 112*a*. Further, a trained machine learning model 110*b* may be generated by executing learning on the machine learning model 110*b* which uses the training data element set generated by the learning process 112*b*.

In this case, as described above, the machine learning model may output a predicted value calculated based on a plurality of types of performance index values.

In this case, the teacher data may include performance index value data indicating the plurality of types of performance index values. Further, a comprehensive performance evaluation value may be calculated in accordance with a given calculation formula based on the plurality of types of performance index values. Moreover, the value of the given evaluation function (error function) may be calculated based on the calculated comprehensive performance evaluation value and a predicted value of the comprehensive performance evaluation value output from the machine learning model.

As another example, a training data element including teacher data in which a comprehensive performance evaluation value calculated in accordance with a given calculation formula based on a plurality of types of performance index values is set may be generated. Further, the value of the given evaluation function (error function) may be calculated based on the comprehensive performance evaluation value indicated by the teacher data and a predicted value of the comprehensive performance evaluation value output from the machine learning model.

Further, as described above, the machine learning model may output a predicted value of the same type of performance index value as that of the input performance index value.

In this case, the training data element may be generated so as to include learning input data indicating a certain type of performance index value for a period of the length T1 up to the reference time point and teacher data indicating the certain type of performance index value for a period of the length T2 from the reference time point. Further, the value of a given evaluation function (error function) may be calculated based on the performance evaluation value indicated by the teacher data and a predicted value output from the machine learning model.

Figure 14:
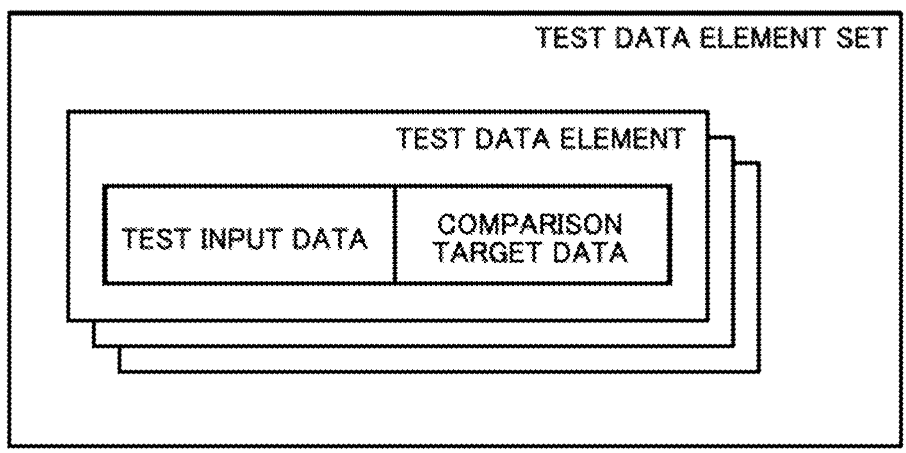
FIG. 14 is a diagram for illustrating an example of a test data element set.

Further, the test process 114 generates a test data element set illustrated in FIG. 14 based on the test data, which is included in the performance index file acquired as described above. As illustrated in FIG. 14, the test data element set includes a plurality of test data elements, and each test data element includes test input data and comparison target data.

In this case, for example, the test process 114*a* may generate test data elements which include test input data including the performance index value data having the performance index value type "b11" and comparison target data including the performance index value data having the performance index value type "a1," which are included in the performance index value file.

Then, the test process 114*b* may generate test data elements which include test input data including the performance index value data having the performance index value type "b21" and the performance index value data having the performance index value type "b22" and comparison target data including the performance index value data having the performance index value type "a1," which are included in the performance index value file.

The test process 114*c* may generate test data elements which include test input data including the performance index value data having the performance index value type "b31," the performance index value data having the performance index value type "b32," and the performance index value data having the performance index value type "b33" and comparison target data including the performance index value data having the performance index value type "a1," which are included in the performance index value file.

Figure 15:
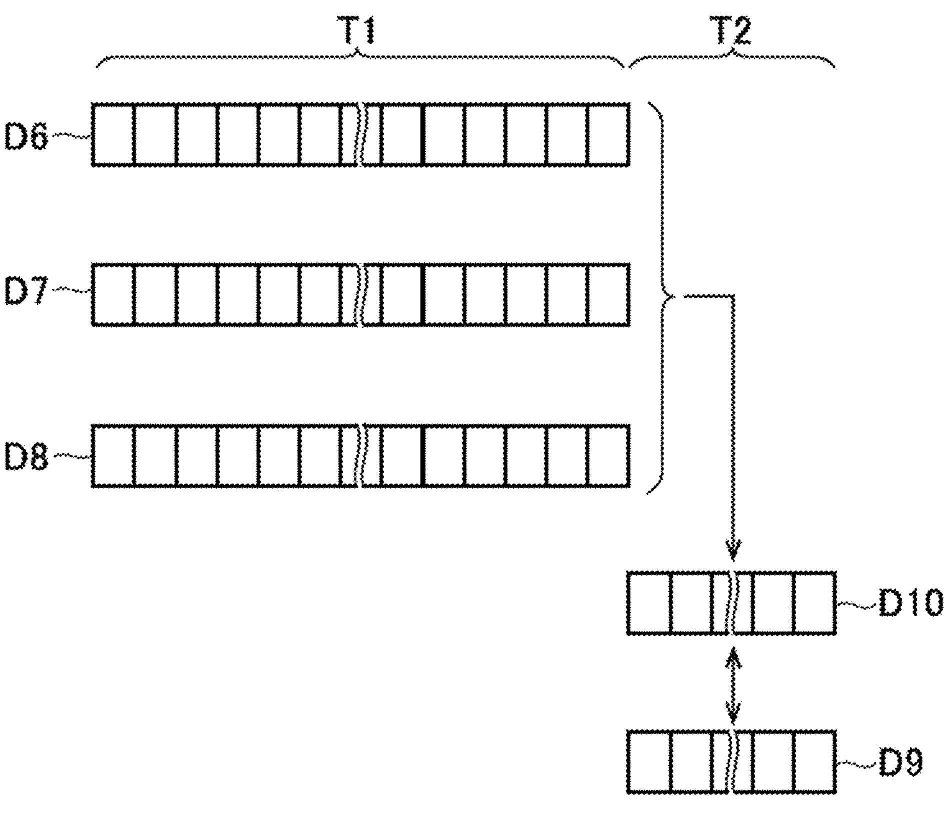
FIG. 15 is a diagram for schematically illustrating an example of test data elements.

FIG. 15 is a diagram for schematically illustrating an example of test data elements generated by the test process 114*c*. In this case, for example, test input data including performance index value data D6 indicating the performance index value of the type "b31," performance index value data D7 indicating the performance index value of the type "b32," and performance index value data D8 indicating the performance index value of the type "b33" for a period of the length T1 (for example, 60 minutes) up to a certain reference time point is generated. Further, comparison target data D9 including the performance index value data indicating the performance index value of the type "a1" for a period of the length T2 (for example, period from the reference time point to 20 minutes after the reference time point) from the reference time point is generated. Then, a test data element including the test input data and the comparison target data generated in this way is generated.

As a result, a test data element set including a plurality of test data elements generated as described above for various reference time points is generated by the test process 114*c*.

In the same way, test data element sets are generated by the test process 114*a* and the test process 114*b*.

In this way, a test data element having the same format as the format of the training data is generated.

In this embodiment, for example, the type of performance index value indicated by the performance index value data included in the learning input data corresponding to the machine learning model and the type of performance index value indicated by the performance index value data included in the test input data corresponding to the machine learning model are the same. Further, the type of performance index value indicated by the performance index value data included in the teacher data corresponding to the machine learning model and the type of performance index value indicated by the performance index value data included in the comparison target data corresponding to the machine learning model are the same.

Further, in this embodiment, for example, the number of pieces of the performance index value data included in the learning input data corresponding to the machine learning model and the number of pieces of the performance index value data included in the test input data corresponding to the machine learning model are the same. Further, the number of pieces of the performance index value data included in the teacher data corresponding to the machine learning model and the number of pieces of the performance index value data included in the comparison target data corresponding to the machine learning model are the same.

In this embodiment, as described above, the training data and the test data are different data, and the training data is not utilized as the test data.

Further, in this embodiment, for example, the AI 70 inputs, to each of a plurality of trained machine learning models 110 to be used for a given prediction purpose related to the communication system 1, the input data corresponding to the machine learning model 110. In this case, the input data is a part of the test data, and is data indicating the actual result value of at least one type of performance index value for at least one of time points. Moreover, pieces of the input data to be input to the plurality of trained machine learning models 110 are different from each other. In addition, in this embodiment, for example, the AI 70 acquires, as the output of the machine learning model 110, a predicted value for a prediction time point after any one of the above-mentioned time points.

As described above, the type of the actual result value indicated by the input data and the type of the predicted value output from the machine learning model 110 may be the same or different.

For example, the test process 114 inputs, to the trained machine learning model 110, test input data indicating the performance index value at the at least one time point included in the test data element. Further, the test process 114 acquires the output obtained when the test input data is input to the machine learning model 110. This output indicates the predicted value for a prediction time point after any one of the above-mentioned time points. For example, as illustrated in FIG. 15, the test process 114*c* acquires an output D10 obtained when the test data element is input to the machine learning model 110*c*. The predicted value indicated by the output D10 is the predicted value of the performance index value having the type "a1."

Further, in this embodiment, for example, for each of the plurality of trained machine learning models, the AI 70 evaluates the accuracy of the prediction related to the prediction purpose by the machine learning model based on the acquired predicted value and, of the test data, a part indicating the actual result value at at least one type of prediction time point corresponding to the predicted value.

For example, the test process 114 evaluates the accuracy of the prediction related to the above-mentioned prediction purpose by the machine learning model 110 based on the comparison target data included in the test data element and the output obtained when the test input data included in the test data element is input to the machine learning model 110.

In this case, for example, the test process 114 may calculate the value of a given evaluation function (error function) based on the comparison target data included in the test data element and the output obtained when the test input data included in the test data element is input to the machine learning model 110. Further, the test process 114 may calculate a representative value (for example, sum or average) of the evaluation function calculated for a plurality of test data elements as an evaluation value of the accuracy of a prediction related to the above-mentioned prediction purpose by the machine learning model.

For example, the test process 114*c* calculates the value of a given evaluation function based on the comparison target data D9 included in the test data element and the output D10. Further, the test process 114*c* evaluates the accuracy of prediction related to the prediction purpose "a1" by the machine learning model 110*c* based on the value of the evaluation function calculated for each of the plurality of test data elements included in the test data element set.

Further, the AI 70 determines at least one of the plurality of trained machine learning models 110 based on the evaluation result of the accuracy of the above-mentioned prediction for each of the plurality of machine learning models 110. In this case, for example, a machine learning model suitable for the communication system 1 is determined.

The AI 70 may, for example, determine the machine learning model the smallest representative value of the 110 having evaluation function as the machine learning model suitable for the network service. As another example, the AI 70 may determine one or a plurality of machine learning models 110 having a representative value of the evaluation function which is smaller than a predetermined value as machine learning models suitable for the network service.

In this case, as described above, the machine learning model may output a predicted value calculated based on a plurality of types of performance index values.

In this case, the comparison target data may include performance index value data indicating the plurality of types of performance index values. Further, comprehensive performance evaluation value may be calculated in accordance with a given calculation formula based on the plurality of types of performance index values. Moreover, the value of the given evaluation function (error function) may be calculated based on the calculated comprehensive performance evaluation value and a predicted value of the comprehensive performance evaluation value output from the machine learning model.

As another example, a test data element including comparison target data in which a comprehensive performance evaluation value calculated in accordance with a given calculation formula based on a plurality of types of performance index values is set may be generated. Further, the value of the given evaluation function (error function) may be calculated based on the comprehensive performance evaluation value indicated by the comparison target data and a predicted value of the comprehensive performance evaluation value output from the machine learning model.

Further, as described above, the machine learning model may output a predicted value of the same type of performance index value as that of the input performance index value.

In this case, the test data element may be generated so as to include test input data indicating a certain type of performance index value for a period of the length T1 up to the reference time point and comparison target data indicating the certain type of performance index value for a period of the length T2 from the reference time point. Further, the value of a given evaluation function (error function) may be calculated based on the performance evaluation value indicated by the comparison target data and a predicted value output from the machine learning model.

Further, the AI 70 may add the types of the performance index values which are required to be added in order to use the machine learning model determined in this way to the monitoring targets by the actual result determination process 106*a*. For example, an actual result determination process 106*a* associated with the type of performance index value which is required to be added in order to use the machine learning model determined in this way may be generated. Further, a determination process (in other words, a process for monitoring at least one type of performance index value related to the communication system 1) may be executed by the generated actual result determination process 106*a*.

Further, an estimation process 108 and a prediction determination process 106*b* linked to the actual result determination process 106*a* may be generated. In this case, for example, the estimation process 108 and the prediction determination process 106*b* may be activated. The estimation process 108 may then predict the performance index value of the communication system 1 by using the trained machine learning model determined in this way.

Figure 16:
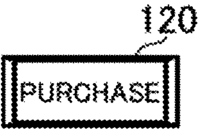
FIG. 16 is a diagram for illustrating an example of a recommendation screen.

As another example, the machine learning model determined in this way may be recommended to a user, for example, purchaser. For example, a recommendation screen illustrated in FIG. 16 may be displayed on a terminal used by the purchaser of the network service. In response to the user clicking a purchase button 120 arranged on the recommendation screen, the actual result determination process 106*a*, the estimation process 108, and the prediction determination process 106*b* may be generated. The estimation process 108 may then predict the performance index value of the communication system 1 by using the trained machine learning model determined in this way.

Further, in this embodiment, for each of a plurality of prediction purposes, at least one machine learning model (for example, at least one machine learning model suitable for the communication system 1) from among a plurality of machine learning models to be used for the prediction purpose may be determined.

In the above description, the above-mentioned processes are executed based on the performance index value files accumulated in the big-data platform 66, but those processes may be executed based on performance index value files stored in the queues 100.

Further, in this embodiment, even when the type of performance index value input to the machine learning models is the same, when the length of time covered by the performance index value input to the machine learning models (for example, above-mentioned T1) or the length of time covered by the predicted value output from the machine learning models (for example, above-mentioned T2) is different, those machine learning models may be treated as different machine learning models.

Figure 17:
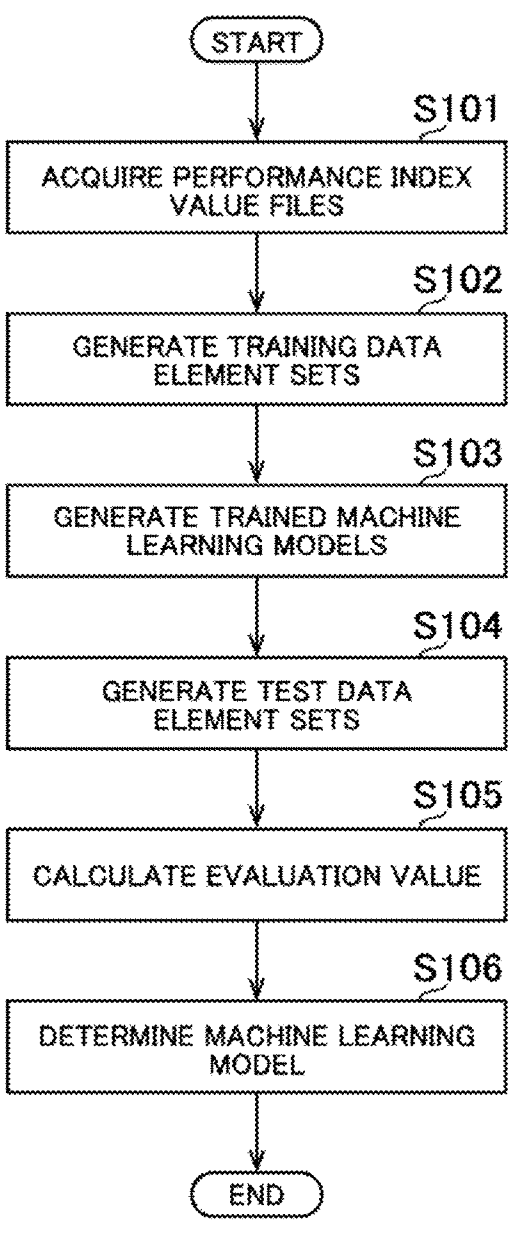
FIG. 17 is a flow chart for illustrating an example of a flow of a process performed by the platform system in the one embodiment of the present invention.

Now, an example of a flow of a process relating to the determination of the machine learning model suitable for the network service, which is a part of the communication system 1 and is purchased by a specific purchaser, is described with reference to a flow chart exemplified in FIG. 17.

In this process example, it is assumed that the prediction purpose of the machine learning model to be determined is a given prediction purpose. Further, it is assumed that there are a plurality of machine learning models to be used for the prediction purpose.

First, the AI 70 acquires at least one performance index value file related to the element included in the network service purchased by the purchaser which is accumulated in the big-data platform 66 (Step S101). In the following process, a part of the data included in the performance index file acquired in the process step of Step S101 is used as training data, and the remainder is used as test data.

The AI 70 then generates, based on the training data acquired in the process step of Step S101, a plurality of training data element sets associated with each of the plurality of machine learning models to be used for the prediction purpose (Step S102).

Then, the AI 70 generates, for each of the plurality of machine learning models, a plurality of trained machine learning models by executing learning which uses the training data element set generated in the process step of Step S102 (Step S103).

The AI 70 then generates, based on the test data acquired in the process step of Step S101, a plurality of test data element sets associated with each of the plurality of machine learning models (Step S104).

Then, the AI 70 calculates, for each of the plurality of trained machine learning models generated in the process step of Step S103, an evaluation value indicating the accuracy of the prediction related to the prediction purpose for the machine learning model by using the test data element set associated with the machine learning model (Step S105).

Then, the AI 70 determines, based on the evaluation values calculated for the plurality of machine learning models in the process step of Step S105, at least one machine learning model among the plurality of machine learning models as a machine learning model suitable for the network service (Step S106). Then, the process illustrated in this process example is ended.

A plurality of machine learning models having different types of data to be input may be prepared for the same prediction purpose related to the communication system 1.

According to this embodiment, as described above, the prediction accuracy of each of a plurality of machine learning models is evaluated based on the actual result values of the performance index values related to the elements included in the communication system 1 (for example, the elements included in the network service). Further, at least one of the plurality of machine learning models is determined based on the accuracy evaluation result.

In this way, according to this embodiment, it is possible to accurately determine the machine learning model suitable for the communication system from among the plurality of machine learning models to be used for the given prediction purpose related to the communication system.

Further, in this embodiment, as described below, the machine learning model may be determined based on the type of a performance index value which is required to be added to the target of monitoring in order to use the machine learning model.

In the following description, it is assumed that the purchaser of the network service has selected the medium-level option when purchasing the network service. Further, it is assumed that a determination process by the actual result determination process 106*a* is executed for some of the elements included in the network service.

It is also assumed that the inventory database 82 stores actual result determination target data indicating the type of element being monitored by the actual result determination process 106*a* and the type of performance index value being monitored for the element.

In this case, for each of a plurality of machine learning models to be used for a given prediction purpose related to the communication system 1, the AI 70 may identify an additional performance index value type, which is a type of performance index value which is required to be added as a target of the monitoring in order to use the machine learning model.

For example, the AI 70 may identify, for each of the plurality of machine learning models, a type of a performance index value not included in the target of the monitoring among the types of performance index values which are inputs to the machine learning model, as the additional performance index value type.

For example, the AI 70 may determine, for each of a plurality of pieces of AI data included in the model management data including purpose management data indicating a given prediction purpose, whether or not the type of performance index value indicated by the input performance index value data included in the AI data is indicated in the actual result determination target data described above.

Among the types of performance index values indicated by the input performance index value data, a type of performance index value not indicated in the above-mentioned actual result determination target data may be determined as an additional performance index value type for the machine learning model associated with the AI data.

Then, the AI 70 may determine at least one machine learning model among the plurality of machine learning models based on the additional performance index value type identified for each machine learning model.

In this case, the AI 70 may determine at least one machine learning model among the plurality of machine learning models based on the number of additional performance index value types. For example, the machine learning model associated with the AI data having the fewest identified additional performance index value types may be determined. As another example, a machine learning model associated with AI data in which the number of identified additional performance index value types is less than a predetermined number may be determined.

Further, the AI 70 may determine at least one machine learning model among the plurality of machine learning models based on a ratio of the number of additional performance index value types to the number of types of performance index values to be input to the machine learning model. For example, the machine learning model associated with the AI data having the smallest ratio of the number of identified additional performance index value types to the total number of pieces of input performance index value data may be determined. As another example, a machine learning model associated with AI data in which the ratio of the number of identified additional performance index value types to the total number of pieces of input performance index value data is smaller than a predetermined ratio may be determined.

Further, in this embodiment, the AI 70 may determine the machine learning model based on the evaluation result of the prediction accuracy and the above-mentioned additional performance index value type.

For example, a plurality of machine learning models may be determined based on the evaluation result of the prediction accuracy. Moreover, at least one machine learning model may be determined by narrowing down the plurality of machine learning models determined in this way based on the additional performance index value type.

Further, a plurality of machine learning models may be determined based on the additional performance index value type. Moreover, at least one machine learning model may be determined by narrowing down the plurality of machine learning models determined in this way based on the evaluation result of the prediction accuracy.

Further, as described above, the AI 70 may add the performance index values of the types which are required to be added in order to use the machine learning model determined in this way to the monitoring targets by the actual result determination process 106*a*. The actual result determination process 106*a* associated with a type of performance index value which is required to be added in order to use the trained machine learning model determined in this manner may be generated.

Further, the estimation process 108 linked to the actual result determination process 106*a* and the prediction determination process 106*b* may be generated. In this case, for example, the estimation process 108 and the prediction determination process 106*b* may be activated. The estimation process 108 may then predict the performance index value of the communication system 1 by using the trained machine learning model determined in this way.

Even when the prediction purpose is the same, various patterns are conceivable for the types of the actual result values of the performance index values which correspond to explanatory variables for prediction and which are input to the machine learning model.

Meanwhile, the types of performance index values that are monitored for actual depending the result values vary on situation, and hence, even among machine learning models used for the same prediction purpose, some of those machine learning models may be suitable for the communication system 1 and some may not be suitable for the communication system 1.

In the example described above, a machine learning model suitable for the communication system 1 is determined based on the additional performance index value types. For example, a machine learning model having a low additional monitoring burden is determined. In this way, in the example described above, it becomes possible to more accurately determine the machine learning model which is to be used for predicting a performance index value of the communication system 1 and which is suitable for the communication system 1.

Further, in this embodiment, the AI 70 may determine, for each of a plurality of time slots, the machine learning model to be used in prediction in the time slot.

For example, the prediction accuracy of each of a plurality of machine learning models may be evaluated based on daytime performance index value data. Further, a machine learning model to be used for daytime prediction may be determined based on the accuracy evaluation result. Moreover, the prediction accuracy of each of the plurality of machine learning models may be evaluated based on nighttime performance index value data, and a machine learning model to be used for nighttime prediction may be determined based on the accuracy evaluation result.

Further, for example, the prediction accuracy of each of a plurality of machine learning models may be evaluated based on weekday performance index value data. Further, a machine learning model to be used for weekday prediction may be determined based on the accuracy evaluation result. Moreover, the prediction accuracy of each of the plurality of machine learning models may be evaluated based on holiday performance index value data, and a machine learning model to be used for holiday prediction may be determined based on the accuracy evaluation result.

In this way, for each of a plurality of time slots, it is possible to accurately determine a machine learning model which is to be used for predicting a performance index value of the communication system 1 and which is suitable for the time slot.

It should be noted that the present invention is not limited to the above-mentioned embodiment.

For example, in this embodiment, scale-out of the elements of the core network system 34 may be executed in place of the elements of the RAN 32 such as a qNB. For example, scale-out may be executed on the AMFs 46, the SMEs 48, and the UPFs 50. Further, in this case, performance index value data related to the elements of the core network system 34 may be used to determine whether or not to execute scale-out. As another example, performance index value data related to the elements of the RAN 32 and the elements of the core network system 34 may be used for the determination.

Further, scale-out of transport may be executed in the same way.

In addition, in this embodiment, the purchaser of the network service can refer, via a dashboard screen, for example, to the content of the performance index value files for the elements included in the network service which have been accumulated in the big-data platform 66.

Further, the above-mentioned process for determining the machine learning model and the processes relating to the determination process may be executed by a functional module other than the AI 70.

Further, the functional unit in this embodiment is not limited to those illustrated in FIG. 3.

Further, the functional unit in this embodiment is not required to be an NF in 5G. For example, the functional unit in this embodiment may be an eNodeB, a vDU, a vCU, a packet data network gateway (P-GW), a serving gateway (S-GW), a mobility management entity (MME), a home subscriber server (HSS), or another network node in 4G.

Further, the functional unit in this embodiment may be implemented through use of a hypervisor-type or host-type virtualization technology instead of the container-type virtualization technology. Further, the functional unit in this embodiment is not required to be implemented by software, and may be implemented by hardware such as an electronic circuit. Further, the functional unit in this embodiment may be implemented by a combination of an electronic circuit and software.

The technology disclosed in the present disclosure can also be expressed as follows.

[1] A model determination system including: test data acquisition means for acquiring test data indicating a time values of a plurality of types of series of actual result values related to a communication system; performance index predicted value acquisition means for inputting, to each of a plurality of trained machine learning models to be used for a given prediction purpose related to the communication system, input data corresponding to the machine learning model and acquiring a predicted value for a prediction time point, the input data being a part of the test data, the input data indicating the actual result value for at least one of time points with respect to at least one of the plurality of types of performance index values, pieces of the input data to be input to the plurality of trained machine learning models being different from each other, and the prediction time point being later than any one of the time points; prediction accuracy evaluation means for evaluating, for each of the plurality of trained machine learning models, an accuracy of a prediction related to the given prediction purpose by the machine learning model based on the acquired predicted value and, of the test data, a part indicating the actual result value at the prediction time point of the at least one of the plurality of types corresponding to the predicted value; and model determination means for determining at least one machine learning model among the plurality of trained machine learning models based on a result of the evaluation of the accuracy.

[2] The model determination system according to Item [1], wherein the machine learning model is configured to output the predicted value of at least one of the plurality of types of performance index values, and a type of the actual result value indicated by the input data and a type of the predicted value are different.

[3] The model determination system according to Item [1], wherein the machine learning model is configured to output the predicted value of at least one of the plurality of types of performance index values, and a type of the actual result value indicated by the input data and a type of the predicted value are the same.

[4] The model determination system according to any one of Items [1] to [3], further including learning means for generating the plurality of trained machine learning models by executing learning which uses data that is different from the test data and that indicates the actual result values of the plurality of types of performance index values related to the communication system.

[5] The model determination system according to any one of Items [1] to [4], further including: monitoring means for monitoring at least one type of performance index value related to the communication system; and additional performance index value type identification means for identifying, for each of the plurality of trained machine learning models, an additional performance index value type which is a type of performance index value which is required to be added to targets of the monitoring in order to use the machine learning model, and wherein the model determination means is configured to determine the machine learning model based on the result of the evaluation of the accuracy and the additional performance index value type.

[6] The model determination system according to Item [5], further including monitoring target addition means for adding, to monitoring targets by the monitoring means, the performance index value of the additional performance index value type which is required to be added in order to use the determined machine learning model.

[7] The model determination system according to any one of Items [1] to [4], further including: monitoring means for monitoring at least one type of performance index value related to the communication system; and monitoring target addition means for adding, to monitoring targets by the monitoring means, a type of performance index value which is required to be added in order to use the determined machine learning model.

[8] The model determination system according to any one of Items [1] to [7], further including prediction means for predicting the performance index value of the communication system by using the determined machine learning model.

[9] The model determination system according to any one of Items [1] to [8], wherein the model determination means is configured to determine, for each of a plurality of time slots, the machine learning model to be used in prediction in the time slot.

[10] A model determination method including: acquiring test data indicating a time series of actual result values of a plurality of types of performance index values related to a communication system; inputting, to each of a plurality of trained machine learning models to be used for a given prediction purpose related to the communication system, input data corresponding to the machine learning model and acquiring a predicted value for a prediction time point, the input data being a part of the test data, the input data indicating the actual result value for at least one of time points with respect to at least one of the plurality of types of performance index values, pieces of the input data to be input to the plurality of trained machine learning models being different from each other, and the prediction time point being later than any one of the time points; evaluating, for each of the plurality of trained machine learning models, an accuracy of a prediction related to the given prediction purpose by the machine learning model based on the acquired predicted value and, of the test data, a part indicating the actual result value at the prediction time point of the at least one of the plurality of types corresponding to the predicted value; and determining at least one machine learning model among the plurality of trained machine learning models based on a result of the evaluation of the accuracy.

The invention claimed is:

1. A model determination system, comprising one or more processors, the model determination system causing at least one of the one or more processors to execute:

an actual data acquisition process of acquiring actual data configured to indicate a time series of actual result values of a plurality of types of performance index values related to a communication system;

a predicted value acquisition process of inputting, to each of a plurality of trained machine learning models, input data configured to indicate at least one actual result value of a performance index value corresponding to a machine learning model at least one time point before a first time point, and acquiring a predicted value for a second time point that is after the first time point, at least one type of performance index value corresponding to each of the plurality of trained machine learning models being different from each other, the input data being a part of the actual data acquired by the actual data acquisition process, and the predicted value being acquired as an output of the machine learning model;

a prediction accuracy evaluation process of evaluating, for each of the plurality of trained machine learning models, an accuracy by the machine learning model based on the predicted value at the second time point and an actual result value at the second time point of the actual data acquired by the actual data acquisition process; and a model determination process of determining at least one machine learning model usable for a prediction at a third time point that is after the second time point among the plurality of trained machine learning models based on a result of evaluating the accuracy.

2. The model determination system according to claim 1, wherein the machine learning model is configured to output the predicted value of at least one of the plurality of types of performance index values, and wherein a type of the actual result value at least one time point before the first time point input to the machine learning model and a type of the predicted value output by the machine learning model are different.

3. The model determination system according to claim 1, wherein the machine learning model is configured to output the predicted value of at least one of the plurality of types of performance index values, and wherein a type of the actual result value at least one time point before the first time point input to the machine learning model and a type of the predicted value output by the machine learning model are the same.

4. The model determination system according to claim 1, wherein the model determination system further causes the at least one of the one or more processors to execute a learning process of generating the plurality of trained machine learning models by executing learning configured to use data that is different from the actual data and that is configured to indicate the actual result values of the plurality of types of performance index values related to the communication system.

5. The model determination system according to claim 1, wherein the model determination system further causes the at least one of the one or more processors to execute:

a monitoring process of monitoring at least one type of performance index value related to the communication system; and an additional performance index value type identification process of identifying, for each of the plurality of trained machine learning models, an additional performance index value type which is a type of performance index value which is required to be added to targets of the monitoring in order to use the machine learning model, and wherein the model determination system causes the at least one of the one or more processors to execute the model determination process such that the at least one machine learning model usable for the prediction at the third time point is determined based on the result of evaluating the accuracy and the additional performance index value type.

6. The model determination system according to claim 5, wherein the model determination system further causes the at least one of the one or more processors to execute a monitoring target addition process of adding, to monitoring targets in the monitoring process, the performance index value of the additional performance index value type which is required to be added in order to use the at least one machine learning model usable for the prediction at the third time point that is determined.

7. The model determination system according to claim 1, wherein the model determination system is further configured to cause the at least one of the one or more processors to execute:

a monitoring process of monitoring at least one type of performance index value related to the communication system; and a monitoring target addition process of adding, to monitoring targets in the monitoring process, a type of performance index value which is required to be added in order to use the at least one machine learning model usable for the prediction at the third time point that is determined.

8. The model determination system according to claim 1, wherein the model determination system further causes the at least one of the one or more processors to execute a prediction process of predicting the performance index value of the communication system by using the at least one machine learning model usable for the prediction at the third time point that is determined.

9. The model determination system according to claim 1, wherein the model determination system causes the at least one of the one or more processors to execute the model determination process such that, for each of a plurality of time slots, at least one machine learning model useable in prediction in a time slot of the plurality of time slots is determined.

10. A computer-implemented model determination method, comprising:

acquiring an actual data configured to indicate a time series of actual result values of a plurality of types of performance index values related to a communication system;

inputting, to each of a plurality of trained machine learning models, input data configured to indicate at least one actual result value of a performance index value corresponding to a machine learning model at least one time point before a first time point and acquiring a predicted value for a second time point that is after the first time point, at least one type of performance index value corresponding to each of the plurality of trained machine learning models being different from each other, the input data being a part of the actual data, and the predicted value being acquired as an output of the machine learning model;

evaluating, for each of the plurality of trained machine learning models, an accuracy of a prediction by the machine learning model based on the predicted value at the second time point and an actual result value at the second time point of the actual data; and determining at least one machine learning model usable for a prediction at a third time point that is later than the second time point among the plurality of trained machine learning models based on a result of evaluating the accuracy.

* * * * *